United States Patent
Thirumalai

(10) Patent No.: US 10,904,532 B2
(45) Date of Patent: Jan. 26, 2021

(54) DIFFERENTIAL PREFIX CODING FOR HIGH THROUGHPUT ENTROPY CODER IN DISPLAY COMPRESSION

(71) Applicant: Samsung Display Co., Ltd., Yongin (KR)

(72) Inventor: Vijayaraghavan Thirumalai, Fremont, CA (US)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/453,825

(22) Filed: Jun. 26, 2019

(65) Prior Publication Data

US 2020/0374523 A1 Nov. 26, 2020

Related U.S. Application Data

(60) Provisional application No. 62/850,425, filed on May 20, 2019.

(51) Int. Cl.

| | |
|---|---|
| *H04N 19/13* | (2014.01) |
| *H04N 19/91* | (2014.01) |
| *H04N 19/103* | (2014.01) |
| *H04N 19/112* | (2014.01) |
| *H04N 19/60* | (2014.01) |
| *H04N 19/176* | (2014.01) |
| *H04N 19/132* | (2014.01) |
| *H04N 19/119* | (2014.01) |

(52) U.S. Cl.
CPC .......... *H04N 19/13* (2014.11); *H04N 19/103* (2014.11); *H04N 19/112* (2014.11); *H04N 19/119* (2014.11); *H04N 19/132* (2014.11); *H04N 19/176* (2014.11); *H04N 19/60* (2014.11); *H04N 19/91* (2014.11)

(58) Field of Classification Search
CPC .... H04N 19/13; H04N 19/132; H04N 19/103; H04N 19/112; H04N 19/60; H04N 19/119; H04N 19/91; H04N 19/176
See application file for complete search history.

(56) References Cited

U.S. PATENT DOCUMENTS

| | | | |
|---|---|---|---|
| 9,877,048 B2 * | 1/2018 | Thirumalai | H04N 19/136 |
| 10,142,629 B2 | 11/2018 | Wu et al. | |
| 10,547,843 B1 * | 1/2020 | Thirumalai | H04N 19/176 |
| 2015/0358645 A1 * | 12/2015 | Thirumalai | H04N 19/46 |
| | | | 375/240.02 |
| 2016/0044339 A1 | 2/2016 | Sung | |

(Continued)

*Primary Examiner* — Richard A Hansell, Jr.
(74) *Attorney, Agent, or Firm* — Innovation Counsel LLP

(57) ABSTRACT

A method of entropy coding data samples includes for each entropy coding group, determining a native prefix value indicative of the bit size of the suffixes in the group; for each entropy coding group, evaluating at least one prefix coding condition for the group in the current block and the corresponding group in a previous block of sample values; in response to determining that the at least one prefix coding condition is met, applying differential prefix coding to code a differential prefix value for the group in the current block to generate a prefix for the group in the current block; and in response to determining that the at least one prefix coding condition is not met, applying direct prefix coding to code the native prefix value for the group in the current block to generate the prefix for the group in the current block.

19 Claims, 17 Drawing Sheets

(56) References Cited

U.S. PATENT DOCUMENTS

| | | | |
|---|---|---|---|
| 2017/0118473 A1* | 4/2017 | Thirumalai | H04N 19/625 |
| 2017/0188026 A1* | 6/2017 | Wu | H04N 19/13 |
| 2017/0318314 A1* | 11/2017 | Lu | H04N 19/13 |
| 2017/0359583 A1* | 12/2017 | Thirumalai | H04N 19/127 |
| 2020/0021809 A1* | 1/2020 | Thirumalai | H04N 19/13 |

* cited by examiner

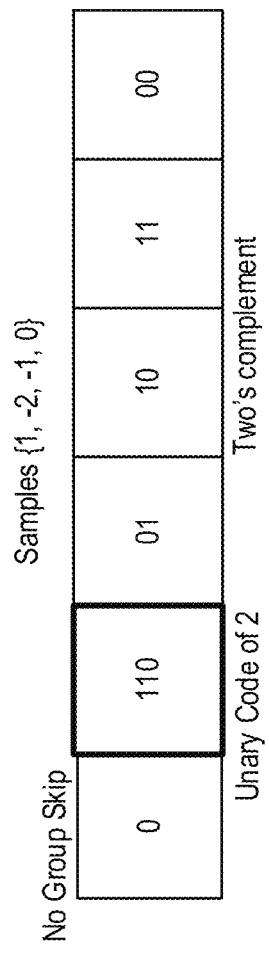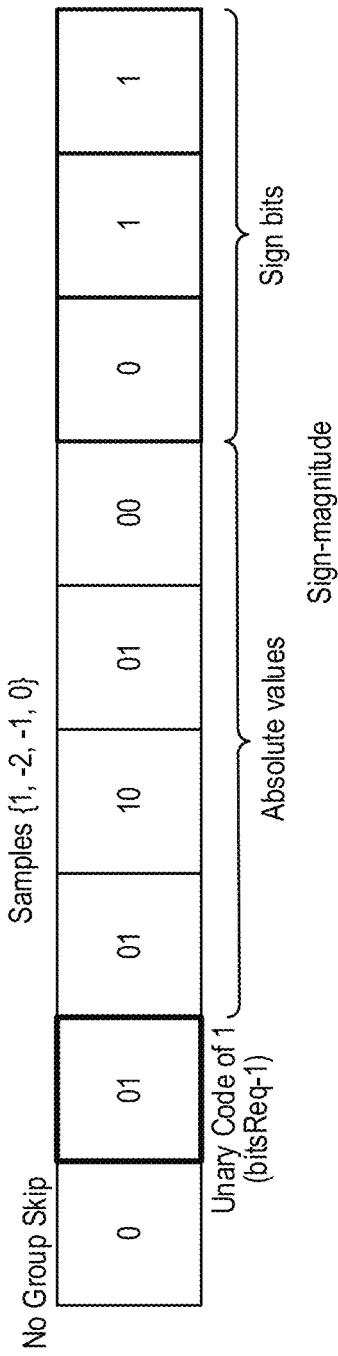
FIG. 5(a)
FIG. 5(b)
FIG. 5

Direct Prefix Coding Table (90)

| Prefix Value $P_i$ | Prefix Code (Unary Code) |
|---|---|
| 1 | 0 |
| 2 | 10 |
| 3 | 110 |
| 4 | 1110 |
| 5 | 11110 |
| 6 | 111110 |
| ... | ... |

FIG. 11(a)

Differential Prefix Coding Table (95)

| Differential Prefix Value $P_i' - P_i$ | Prefix Code (Unary Code) |
|---|---|
| 0 | 0 |
| 1 | 10 |
| -1 | 110 |
| 2 | 1110 |
| -2 | 11110 |
| ... | ... |

| \                                                                                         |||||||
|---|---|---|---|---|---|---|
| Condition 2: Unavailable Prefix Value                                                     |||||||
| Group Index | Previous Block Prefix Value | Current Block Prefix Value | Prefix Coding Required | Differential Prefix Coding applied | Prefix Value Coded | Binary Representation of Value Coded |
| 0 | 2 | 2 | Yes | Yes | 2-2=0 | 0 |
| 1 | x | 1 | Yes | No  | 1     | 0 |
| 2 | 2 | x | No  | -   | -     | - |
| 3 | x | x | No  | -   | -     | - |

Fig. 15

```
Input: previous block prefixes (P0', P1', P2', P3')
       current block prefixes (P0, P1, P2, P3)

Output: coding method for each group for i = 0: 3                         // number of groups
Bool m = condition 1 && condition 2 && condition 3;
    if(m == true)                    //if condition satisfied
        differential coding is applied for group i
    else
        differential coding is NOT applied for group i
end
```

Fig. 19

```
Input: previous block prefixes (P0', P1', P2', P3')
       current block prefixes (P0, P1, P2, P3)

Output: coding method for each group for i = 0: 3                            // number of groups
   if(Pi == unavailable)                // group skip in current block
      prefix coding not required
   else if                              // current group not group skip
     if(Pi' == unavailable)     //group skip in previous block
        Differential coding not applied for current group i
     else
        differential coding is applied for current group i
end
```

Fig. 20

```
Input: previous block prefixes (P0', P1', P2', P3')
       current block prefixes (P0, P1, P2, P3)

Output: coding method for each group for i = 0: 3                          // number of groups
    if(Pi' >= 2)                      // group "i" in previous block
        Differential coding is applied for current group i
    else
        differential coding is not applied for current group i
end
```

Fig. 21

```
Input: previous block prefixes (P0', P1', P2', P3')
       current block prefixes (P0, P1, P2, P3)
       current block mode: curBlkMode
       previous block mode: prevBlkMode Output: coding method for each group for i = 0: 3                          // number of groups
    if(Pi == unavailable)             // group skip in current block
        prefix coding not required
    else if                           // current group not group skip
        if(curBlkMode == prevBlkMode && Pi' != unavailable &&  Pi' >= 2)  //all three conditions
            differential coding is applied for current group i
        else
            differential coding not applied for current group i
end
```

Fig. 22

DIFFERENTIAL PREFIX CODING FOR HIGH THROUGHPUT ENTROPY CODER IN DISPLAY COMPRESSION

CROSS REFERENCE TO RELATED APPLICATIONS

This application claims priority to U.S. Provisional Patent Application No. 62/850,425, entitled DIFFERENTIAL PREFIX CODING FOR HIGH THROUGHPUT ENTROPY CODER IN DISPLAY COMPRESSION, filed May 20, 2019, which is incorporated herein by reference for all purposes.

FIELD OF THE DISCLOSURE

The present disclosure relates to a prefix coding method in a high-throughput entropy coder and, in particular, to an entropy coder implementing differential prefix coding to improve coding efficiency without increasing complexity of the entropy coder.

BACKGROUND OF THE DISCLOSURE

VESA (Video Electronics Standard Association) developed a new display interface compression standard for mobile or smartphone displays or hand-held devices called VESA Display Compression-Mobile or VDC-M. VDC-M targets higher compression ratio than Display Stream Compression (DSC) while maintaining visually lossless quality as of DSC at the cost of increased complexity. VDC-M has application in mobile devices that use a display link, such as the MIPI display serial interface (DSI).

In particular, the VDC-M compression standard is fixed rate codec (encoder-decoder) and supports compression rates down to 6 bits/pixel for a RGB 4:4:4 signal source with 8 bits per color component. VDC-M is a block based codec with a block size of 8×2 pixels. In operation, the VDC-M codec operates by applying or testing multiple coding modes for each block and selecting a best coding mode for a block based on a rate-distortion cost. A different coding mode may be selected for each block. With the selected coding mode, the data samples are encoded using an entropy encoder to generate a compressed bitstream. Substream multiplexing is implemented to enable parallel parsing of the compressed bitstream to achieve a high decoder throughput.

SUMMARY OF THE DISCLOSURE

The present disclosure discloses a device and method for controlling a connected device in a mobile device, substantially as shown in and/or described below, for example in connection with at least one of the figures, as set forth more completely in the claims.

These and other advantages, aspects and novel features of the present disclosure, as well as details of an illustrated embodiment thereof, will be more fully understood from the following description and drawings.

In one embodiment, a method of entropy coding data samples includes receiving a block of a first number of sample values generated by a selected coding mode as a current block of sample values; forming multiple entropy coding groups by distributing the first number of sample values into the plurality of entropy coding groups; converting the sample values in each entropy coding group to a selected bit-based representation, each encoded sample value forming a suffix of the entropy coding group, the suffixes within a respective entropy coding group having the same bit size; for each entropy coding group, determining a native prefix value indicative of the bit size of the suffixes in the group; for each entropy coding group, evaluating at least one prefix coding condition for the group in the current block and the corresponding group in a previous block of sample values; in response to determining that the at least one prefix coding condition is met, applying differential prefix coding to code a differential prefix value being a difference between the native prefix value of the group in the previous block and the native prefix value of the group in the current block to generate a bit representation of the differential prefix value to use as a prefix for the group in the current block; and in response to determining that the at least one prefix coding condition is not met, applying direct prefix coding to code the native prefix value for the group in the current block to generate a bit representation of the native prefix value to use as the prefix for the group in the current block.

In another embodiment, a method of entropy coding data samples includes receiving a block of a first number of sample values generated by a selected coding mode as a current block of sample values; forming multiple entropy coding groups by distributing the first number of sample values into the plurality of entropy coding groups; converting the sample values in each entropy coding group to a selected bit-based representation, each encoded sample value forming a suffix of the entropy coding group, the suffixes within a respective entropy coding group having the same bit size; for each entropy coding group, determining a native prefix value indicative of the bit size of the suffixes in the group; for each entropy coding group in the current block, determining whether a group skip has been asserted for the group; in response to determining that the group skip has been asserted for the group, determining prefix coding is not required for the group in the current block; in response to determining that the group skip has not been asserted for the group, evaluating the native prefix value of the group in the current block and the native prefix value for the corresponding group in a previous block of sample values using three prefix coding conditions. The prefix coding conditions includes for a first entropy coding group, determining that the selected coding mode used to code the group in the current block is the same as or is in the same coding mode category as the selected coding mode used to code the group in the previous block; for each entropy coding group, determining that a native prefix value is available for the corresponding group in the previous block of sample values; and for each entropy coding group, determining that the native prefix value for the corresponding group in the previous block of sample values is greater than a first threshold value. The method further includes in response to the three prefix coding conditions being met, in response to the three prefix coding conditions being met, applying differential prefix coding to code a differential prefix value being a difference between the native prefix value of the group in the previous block and the native prefix value of the group in the current block to generate a bit representation of the differential prefix value to use as a prefix for the group in the current block; and in response to at least one of the three prefix coding conditions not being met, applying direct prefix coding to code the native prefix value for the group in the current block to generate a bit representation of the native prefix value to use as the prefix for the group in the current block.

BRIEF DESCRIPTION OF THE DRAWINGS

Various embodiments of the present disclosure are disclosed in the following detailed description and the accompanying drawings.

FIG. 5, which includes FIGS. 5(a) and 5(b), illustrates an example CPEC output for an entropy coding group with 4 samples having sample values {1, −2, −1, 0}.

FIG. 8 which includes FIGS. 8(a) and 8(b), illustrates an exemplary grouping method used to form entropy coding groups for one component in a block of sample values in some examples.

FIG. 9 which includes FIGS. 9(a) and 9(b), illustrates an exemplary grouping method used to form entropy coding groups for one component in a block of sample values in another example.

FIG. 11, which includes FIGS. 11(a) and 11(b), illustrate the coding tables used to code the native prefix values and the differential prefix values in some examples.

FIG. 15 illustrates some example prefix availability conditions in a previous block and in a current block of sample values.

FIG. 19 illustrates the pseudocode for the entropy coding method implementing the selective differential prefix coding using three prefix coding conditions.

FIG. 20 illustrates the pseudocode for the implementing the prefix availability condition.

FIG. 21 illustrates the pseudocode for the implementing the prefix threshold condition.

FIG. 22 illustrates the pseudocode for the implementing the entropy coding method using three prefix coding conditions for selectively applying differential prefix coding.

DETAILED DESCRIPTION

Figure 1:
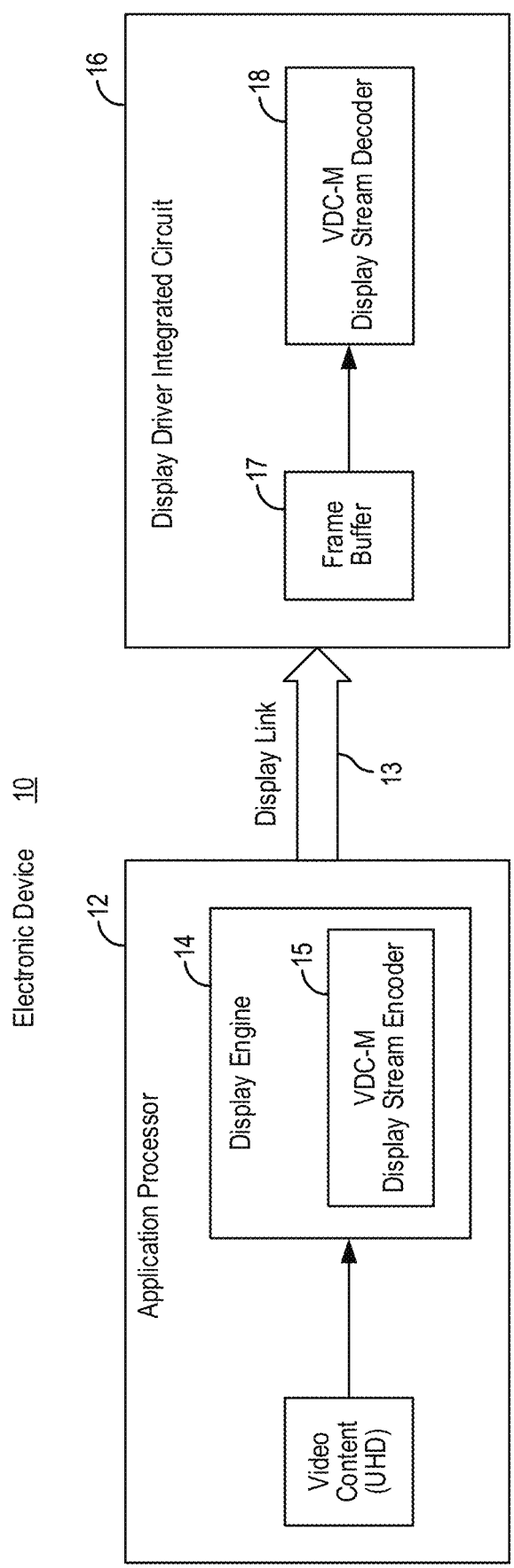
FIG. 1 is a schematic diagram illustrating a system configuration for implementing the display interface codec in some examples.

According to embodiments of the present disclosure, a display interface codec performing video signal compression using one or more coding modes to encode a block of pixel values includes an entropy coder that implements selective differential prefix coding to improve the coding efficiency without increasing coder complexity. In some embodiments, the display interface codec implements an entropy coding method where the native prefix value of each entropy coding group is evaluated using one or more prefix coding conditions to select either differential prefix coding or direct prefix coding to encode the prefix value for the group. In this manner, differential prefix coding is applied only when coding efficiency can be improved. In some examples, for virtual reality (VR) applications, the different prefix coding can realize approximately 1 dB gain for high acuity region.

In some embodiments, the entropy coder is the final block of the encoder of the display interface codec under the VDC-M compression scheme. At the entropy coder, the quantized block coefficients per color component are split into several entropy coding groups, usually four groups, where each group is coded using a common prefix entropy code (CPEC). Using CPEC, each group of N samples includes a prefix value and N suffixes, unless group skip is used when all sample values are zero. In embodiments of the present disclosure, the entropy coder exploits the correlation between neighboring blocks and uses differential coding to code the prefix values in the groups. Furthermore, in some embodiments, differential prefix coding is selectively applied to ensure coding performance improvement across all coding groups.

In embodiments of the present disclosure, the display interface codec includes a display stream decoder which implements the same entropy coding method to decode the prefix of each entropy coding group. In particular, the display stream decoder receives a compressed bitstream generated using the entropy coding method with selective differential prefix coding at the encoder. The decoder determines the prefix coding method used for the prefix of each entropy coding group. The decoder then decodes each group based on the selected prefix coding method used by the display stream encoder. In this manner, no explicit signaling between the transmitter and receiver is required to implement the selective prefix coding method. The decoder performs the same prefix evaluation operation performed at the entropy coder to determine if the prefix of a respective entropy coding group have been coded using differential coding or using direct coding and applies decoding operation accordingly.

The display interface codec and the entropy coding method of the present disclosure realize many advantages over conventional methods. For instance, previous methods for applying differential prefix coding have involved using differential prefix coding for all entropy coding groups for all blocks of samples. In this case, differential prefix coding is applied all of the time and is applied even when using differential prefix coding is not efficient. When differential prefix coding is applied all of the time, the prefix values have to be predicted in some cases and the conventional methods require looking back to past samples to find a suitable predictor value to use for the prediction or using a default predictor value. These solutions are inefficient and undesirable.

In embodiments of the present disclosure, the entropy coding method evaluates the native prefix value of an entropy coding group using one or more prefix coding conditions. Based on the result of the evaluation, the entropy coding method selects the prefix coding method that achieves the optimal coding efficiency for the entropy coding group. For instance, the entropy coding method selects differential prefix coding when applying differential prefix coding improves efficiency. Alternately, the entropy coding method selects the traditional direct prefix coding when using differential prefix coding would not be efficient. In this manner, differential prefix coding is applied only to realize efficiency gain and differential prefix coding is not applied which may result in a loss in efficiency. Accordingly, the entropy coding method applies differential prefix coding selectively to realize an overall efficiency gain.

In embodiments of the present disclosure, the display interface codec performs video signal compression based on the display interface compression standard for mobile or smartphone displays called VESA Display Compression Mobile (or VDC-M). The VDC-M display interface compression standard is described in Jacobson et al., "A new display stream compression standard under development in VESA," Proc. SPIE 10396, Applications of Digital Image Processing XL, 103960U (19 Sep. 2017). In particular, VDC-M is fixed rate codec (encoder-decoder) and supports compression rates down to 6 bits/pixel for a RGB 4:4:4 source with 8 bits per color component. VDC-M is a block based codec with a block size of 8×2 pixels. In operation, the VDC-M codec operates by applying or testing multiple coding modes for each block and selecting a best coding mode for a block based on a rate-distortion cost. A different coding mode may be selected for each block of samples.

FIG. 1 is a schematic diagram illustrating a system configuration for implementing the display interface codec in some examples. Referring to FIG. 1, an electronic device 10 includes an application processor 12 communicating with a display driver integrated circuit 16 over a display link 13. The application processor 12 includes a display engine 14 which receives video content and implements a display stream encoder 15, such as a display stream encoder based on VDC-M display interface compression standard. The encoded bitstream is transmitted from the encoder 15 over the display link 13 to the display driver integrated circuit 16. The display link 13 may be a physical link or a wireless link. The display driver integrated circuit 16 includes a frame buffer 17 for storing the incoming bitstream and providing the received bitstream to a display stream decoder 18, such as a display stream decoder based on VDC-M display interface compression standard.

In some embodiments, the display stream encoder and the display stream decoder are both implemented as hardware components, such as semiconductor integrated circuits. In some embodiments, the display stream encoder and the display stream decoder are implemented as application specific integrated circuits (ASICs). In other embodiments, the display stream decoder is implemented in hardware while the display stream encoder is implemented in software or firmware in the application processor on the host system.

Figure 2:
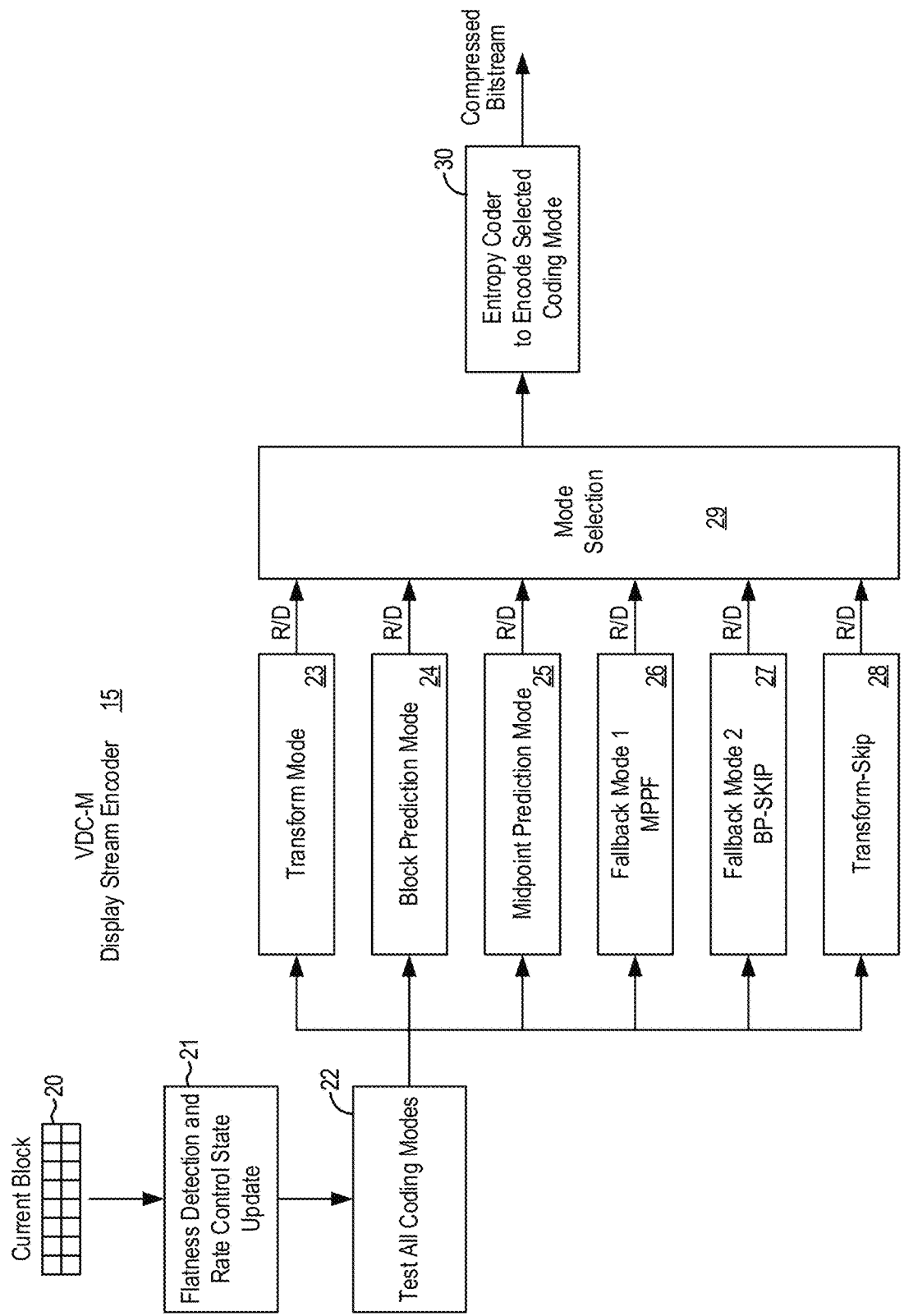
FIG. 2 is a process diagram illustrating the operation of the display stream encoder in some examples.

FIG. 2 is a process diagram illustrating the operation of the display stream encoder in some examples. The VDC-M display interface compression standard is a block based codec with a block size of 8×2 pixels. Accordingly, the display stream encoder 15 operates on the video data in blocks of 8×2 pixels, for example, in 8 columns and 2 rows. Referring to FIG. 2, the display stream encoder 15 receives pixel values for a current block of 8×2 pixels (20). Each block of pixels includes pixel values for one or more color components. For example, each block of pixels typically includes pixel values for three color components. The encoder 15 performs flatness detection and updates the rate control state update (21). The encoder 15 then tests the full set of coding modes in parallel on the pixel values for the current block of pixels (22). In the present example, the coding modes 23-28 are applied. For each coding mode, the encoder 15 determines a rate R of the mode, being the total of all syntax bits required by the mode, and a distortion D. The encoder 15 determines the RD cost for each coding mode. The encoder 15 selects the coding mode with the smallest RD cost (29) subject to rate control constraints. The encoder 15 then encodes the selected coding mode using an entropy coder (30). The entropy coder 30 generates a compressed bitstream which can be transmitted onto the display link. The display stream encoder 15 then move onto the next block of pixels. In operation, a different coding mode may be selected for each block of pixels in a frame of video content.

In the present description, "component" or "color components" refers to the color component used to represent the video signal, which can be RGB or YCbCr or YUV.

Each coding mode in the display stream encoder 15 has properties which are tailored to specific type of video content. In the present example, the display stream encoder 15 implements the following coding modes:

(1) Transform mode (23)—the transform mode is useful for capturing natural contents in the input video source. An example of the transform mode is the discrete cosine transform.

(2) Block prediction (BP) mode (24)—the block prediction mode is useful for capturing graphic and textured contents in the input video source.

(3) Midpoint prediction (MPP) mode (25)—the midpoint prediction mode is useful in capturing uncorrelated noise contents in the input video source.

(4) Fallback Modes (26, 27)—one or more fallback modes are provided to guarantee fixed-rate compression when other modes are not affordable. In the present example, a midpoint prediction fallback (MPPF) mode (26) and a block prediction skip (BP-Skip) mode (27) are provided.

(5) Transform-skip (28)—the transform-skip mode is applied by performing the same operation as the transform mode but without applying the frequency domain transform to the residue values.

Entropy Coder

Figure 3:
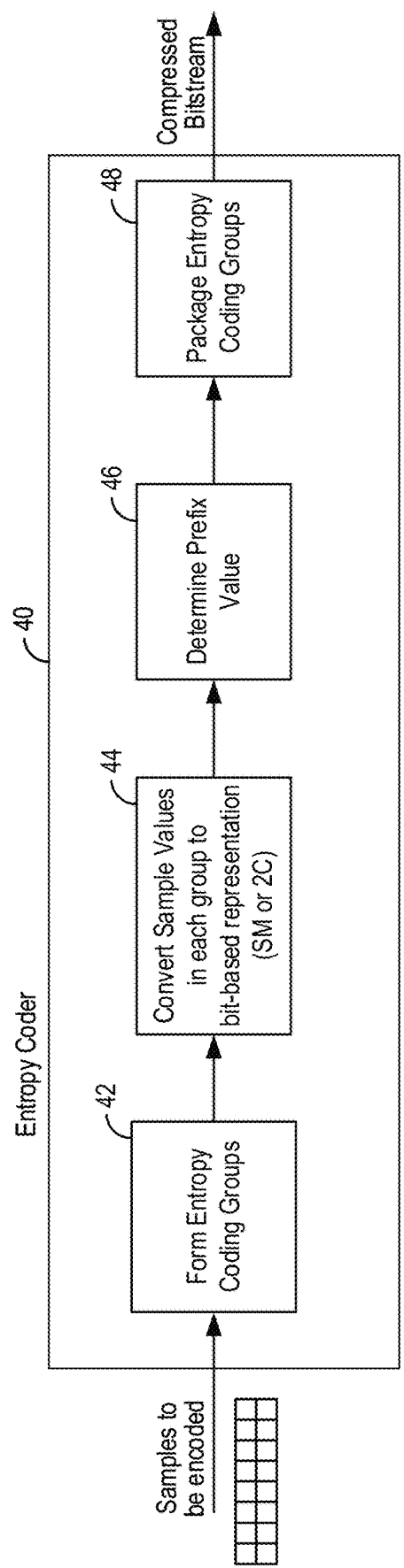
FIG. 3 is a process diagram illustrating the operation of an entropy coder in some examples.

Referring still to FIG. 2, with the coding mode selected, the display stream encoder 15 encodes the samples using the entropy coder (30) being the final block of the encoder in VDC-M compression scheme. FIG. 3 is a process diagram illustrating the operation of an entropy coder in some examples. The entropy coder is designed to facilitate high-throughput at the decoder by dividing the samples in each color component of a block into separate groups. Referring to FIG. 3, the entropy coder 40 receives a current block of 8×2 quantized block coefficients or sixteen data values per color component generated by the selected coding mode. In the present description, the quantized block coefficients or data values of each block for each color component are also referred to as samples or sample values and the entropy coder can be described as receiving a block of sixteen samples for each color component. The 8×2 quantized block coefficients or sixteen samples values are split into a given number of entropy coding group, where each group is coded using a common prefix entropy code (CPEC).

For instance, for each block of data values associated with a respective color component, the entropy coder 40 performs grouping of one or more samples into an entropy coding group (ECG) (42). In particular, the samples in the current block for each component are distributed among a predetermined number of entropy coding groups. For example, for 4:4:4 video content, a block of 16 samples for a component may be distributed into four entropy coding groups.

The operation of the CPEC is as follows. For each entropy coding group that contains N samples, a single prefix and N suffixes are generated. The entropy coder 40 converts the sample values in each group to a predetermined bit-based representation (44). For example, the entropy coder 40 may convert each sample value into the two's complement representation. Alternately, the entropy coder 40 may convert each sample value into sign-magnitude representation. Depending on the bit representation used for the sample values, sign bits may be appended to the end of the group.

The entropy coder 40 then determines the prefix value for each group of the block (46). More specifically, the prefix value represents the number of bits per sample required to code the sample values in an entropy coding group. In one example, each entropy coding group includes a variable length prefix and N fixed-length suffixes being the sample values. The prefix value is the number of bits required to represent each sample value, or each suffix, in the bit-based representation. In the present description, the prefix is a bit-based representation of the prefix value and coding the prefix value refers to converting the prefix value to bit representation where the bit representation is used as the prefix for the entropy coding group. With the prefix and the suffixes thus formed for each group, the entropy coder 40 packages the entropy coding groups into a compressed bitstream to be transmitted (48). In this manner, the encoded data for each color component of the video content will be transmitted in the compressed bitstream as a set of entropy coding groups.

The quantized block coefficients or data values being coded by the entropy coder are a function of the coding mode selected. In one example, when the transform coding mode is selected, the entropy coder encodes the quantized transform coefficients. That is, the data values are the quantized transform coefficients. In another example, when the block prediction mode is selected, the entropy coder encodes the quantized prediction residuals.

In the above description, the video content is assumed to be a 4:4:4 video content. In that case, there are 16 samples per block for each color component. For example, for RGB video signals, each R, G and B color component includes 16 samples per block. In other examples, the video content may be a 4:2:2 video content. For the 4:2:2 video content, the luma component contains a block of 16 samples and the two chroma components contain only 8 samples or 4×2 block size. In yet another example, the video content may be a 4:2:0 video content. For the 4:2:0 video content, the luma component contains a block of 16 samples and the two chroma components contain only 4 samples or 2×2 block size.

Figures 4, 4A, 4B:
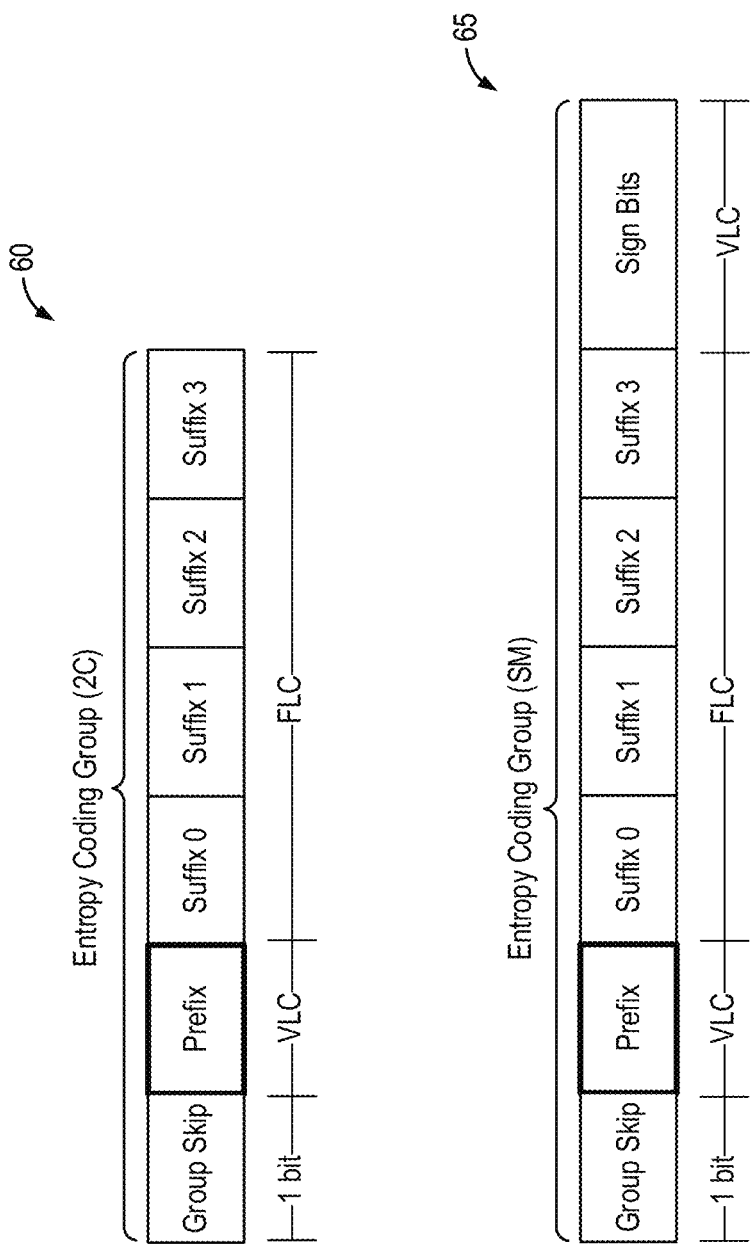
FIG. 4, which includes
FIGS. 4(a) and 4(b), illustrates entropy coding group structure and the output of the common prefix entropy code (CPEC) in some examples.

The entropy coder receives 16 samples for each color component in a current block of data values and divides the samples into entropy coding groups. The sample values in each entropy coding group are then encoded into bit-based representation (for example, two's complement or sign-magnitude). In the present description, the entropy coding groups are coded using common prefix entropy code (CPEC). FIG. 4, which includes FIGS. 4(a) and 4(b), illustrates entropy coding group structure and the output of the common prefix entropy code (CPEC) in some examples. FIG. 4(a) illustrates an CPEC output for an entropy coding group using two's complement representation. FIG. 4(b) illustrates an CPEC output for an entropy coding group using sign-magnitude representation.

Referring to FIG. 4, the entropy coder divided the samples into entropy coding groups. Each entropy coding group 60, 65 consists of a variable-length prefix and one or more fixed-length suffixes. In the present examples, the entropy coding group includes four suffixes—Suffix 0 to Suffix 3 associated with four samples of the block. When sign-magnitude representation is used, the entropy coding group 65 includes sign bits appended to the end of the group. Sign bits are only signed for non-zero sample values.

For each entropy coding group, CPEC is applied to convert the sample values into bit-based representation. In particular, an entropy coding group with a group size of N or N samples includes a variable-length prefix followed by N fixed-length suffixes, N being an integer greater than 0. Using CPEC, the prefix is coded using a variable length code, e.g., unary code, and is a bit representation of the prefix value which is the number of bits used to code each suffix. The actual sample value within the group is represented in the suffix, one suffix for each sample within the group. All N suffixes within the group are allocated the same number of bits, i.e., fixed length code. For example, the samples can be represented in two's complement (FIG. 4(a)) or sign-magnitude representation (FIG. 4(b)). In particular, each suffix in an entropy coding group using CPEC corresponds to one sample value encoded in the given bit-based representation.

When all the samples in a group have zero values, only one bit—the Group Skip bit—is signaled for the entire group. Group skip is applicable for CPEC that uses sign-magnitude and two's complement representation.

FIG. 5, which includes FIGS. 5(a) and 5(b), illustrates an example CPEC output for an entropy coding group with 4 samples having sample values $\{1, -2, -1, 0\}$. FIG. 5(a) illustrates an CPEC output for an entropy coding group using two's complement representation. FIG. 5(b) illustrates an CPEC output for an entropy coding group using sign-magnitude representation.

Referring to FIG. 5(a), using two's complement representation, the number bits required for a faithful reconstruction of the group of sample values is 2 (n bits are required for the range $[-2^{(n-1)}, 2^{(n-1)}-1]$). For the input group of sample values $\{1, -2, -1, 0\}$, the output of CPEC would be a prefix of 110 (unary code of 2) and a suffix where each sample is coded using 2 bits, such as 01 10 11 00, as shown in FIG. 5(a). In this case, the native prefix value for the group is 2. The output of the CPEC in the illustrated example is generated using one of embodiment and the actual output of the CPEC might be different depending on the actual implementation.

The above example illustrates using the two's complement representation to code an entropy coding group (ECG). Other representation such as sign-magnitude are also used with CPEC. Referring to FIG. 5(b), when sign-magnitude representation is used, n bits are required (for each sample), when the absolute value (i.e., magnitude) of all the samples in the group are in the range $[0, 2^{(n-1)}]$. In the sign-magnitude representation, sign bit is signaled only for the non-zero sample values. For the input group of sample value $\{1, -2, -1, 0\}$, the suffixes coded using sign-magnitude representation use 2 bits for each suffix.

In one example, the prefix is a bit representation of the prefix value being the number of bits used to code each suffix, which is denoted as "bitsReq". That is, when 2 bits are used to code each suffix, bitsReq equals 2 and the native prefix value is 2. In other examples, the native prefix value is coded as having a value of "bitsReq−1" instead of bitsReq. This is because for the case bitsReq is zero, the group skip bit is used. Thus, the bitsReq=0 value is not used to denote the case when 0 bits are required to code the suffix. Coding the prefix using the value "bitsReq-1" instead of bitsReq is sometimes preferred as coding a smaller value in unary code reduces cost.

In the example shown in FIG. 5(b), the prefix is coded using the value of "bitsReq-1". Thus, the native prefix value is 1 for a bitsReq value of 2. The output of CPEC in sign-magnitude representation would be a prefix of 01 (unary code of 1), followed by suffixes that codes the absolute value of each sample using 2 bits, such as 01 10 01 00, and at last the sign bits 0 1 1, assuming 0 for positive symbol and 1 for negative symbol. Note that the sign value of last symbol 0 is not signaled. The output of CPEC is shown in FIG. 5(b).

In the example shown in FIGS. 5(a) and 5(b), the group skip bit is not asserted (e.g. a value of "0"). In the case when all the sample values are zero, the group skip bit would be asserted (e.g. a value of "1") and the rest of the bit values are ignored by the decoder.

Figure 6:
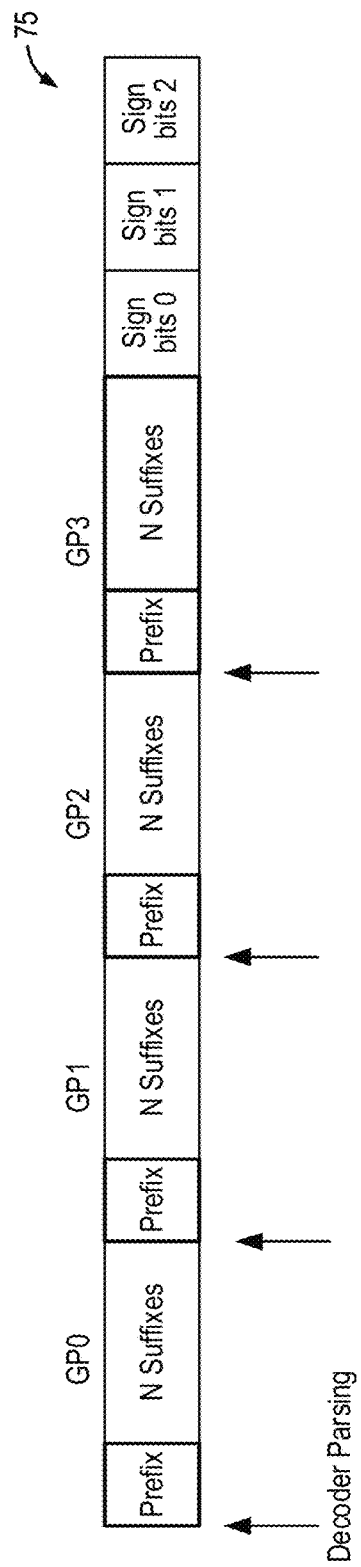
FIG. 6 is a process diagram illustrating the operation of the display driver decoder in some examples.

As thus constructed, the entropy coder divides the samples of each components of a block to generate a set of entropy coding groups which are then transmitted in the compressed bitstream. At the entropy decoder, the variable length prefix of the current group is parsed and the remaining number of suffix bits in the current group is then known. Therefore, the entropy decoder can jump and start parsing the prefix of the next group, while the decoder decodes the suffixes of the previous group, as shown in FIG. 6 (illustrates the decoder operation). Due to the limited number of variable length codes (at most 4 for one color component in a block of size 8×2), the decoder can achieve high throughput. Referring to FIG. 6, the decoder parses the prefix for Group 1 and knows the number of bits for the suffixes in Group 1. The decoder can then jump over all of the suffix bits in Group 1 and starts parsing the prefix for Group 2.

Figure 7:
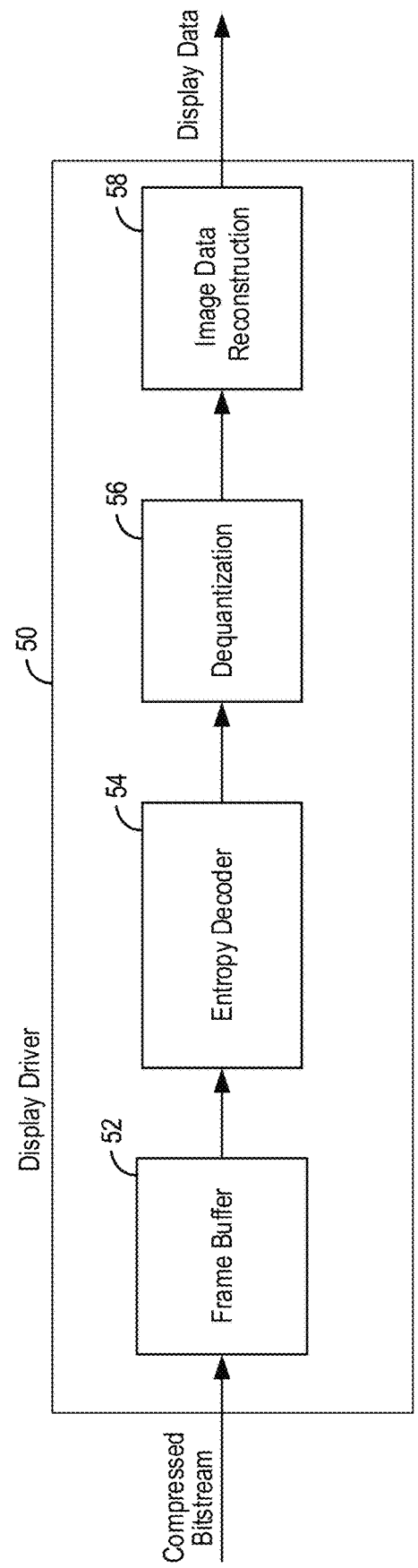
FIG. 7 is a process diagram illustrating the operation of a display driver including an entropy decoder in some examples.

FIG. 7 is a process diagram illustrating the operation of a display driver including an entropy decoder in some examples. Referring to FIG. 7, a display driver 50 includes a frame buffer 52 storing incoming compressed bitstream received from the display link. The received compressed bitstream is provided to an entropy decoder 54 to decode the received bitstream. In embodiments of the present disclosure, the entropy decoder 54 applies the same entropy coding method to decode the prefix of each entropy coding group. For instance, the entropy decoder receives a compressed bitstream generated using the entropy coding method with selective differential prefix coding at the encoder in some embodiments. The decoder, applying the same entropy coding method, determines the prefix coding method used for the prefix of each entropy coding group and decodes each of the entropy coding groups based on the selected prefix coding method used by the display stream encoder. For instance, the decoder performs the same prefix evaluation operation performed at the entropy coder to determine if the prefix of a respective entropy coding group have been coded using differential coding or using direct coding and applies decoding operation accordingly. The display driver 50 further includes a dequantization block 56 to dequantize the decoded quantized values (output of the entropy decoder) according to the coding mode used. In some cases, when transform mode is used, an inverse transform is performed as well after the dequantization block 56. The dequantized residue values are then provided to the image data reconstruction block 58 to generate the reconstructed image data by adding the predictor data to the dequantized values where the predictor data is generated according to the coding mode of the current block. In some cases, the image data reconstruction block 58 also performs clipping in order to limit the reconstructed image data to the dynamic range, i.e., [0 to ($2^{bitDepth}$)-1]. The reconstructed image data is then provided to the display as the display data.

Returning to the entropy coding operation, the entropy coder determines the grouping of samples into entropy coding groups for each component in a block of samples. The size of each entropy coding group, that is, the number of samples to be included in each entropy coding group, will depend on the coding mode, the color component and the chroma sampling format. The distribution of samples within the entropy coding groups is also dependent on the coding mode.

Figures 8, 8A, 8B, 9, 9A, 9B:
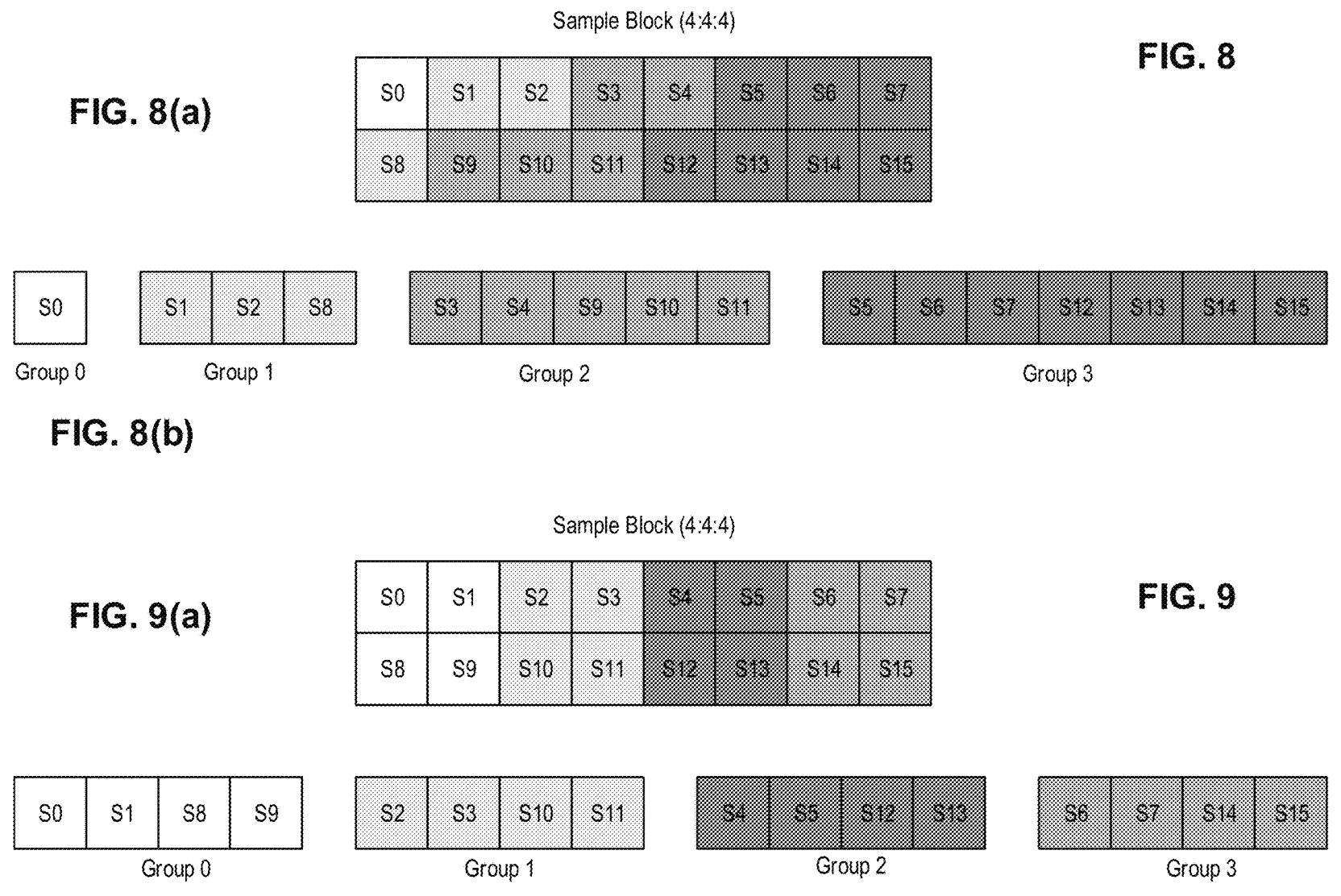

FIG. 8 which includes FIGS. 8(a) and 8(b), illustrates an exemplary grouping method used to form entropy coding groups for one component in a block of sample values in some examples. Referring to FIG. 8(a), each block of sample values for one component contains 8×2 or 16 samples S0 to S15. FIG. 8(b) illustrates a grouping method used in the Transform mode. In the present example, the entropy coder distributes the 16 samples into four entropy coding groups Group 0 to Group 3, where each group is coded using the CPEC structure, as shown in FIG. 8(b). In the present example, a non-uniform grouping method is used where the size or number of samples for each entropy coding group is not the same. For instance, the non-uniform sample distribution is used for the transform mode so that samples with similar frequency in the transform domain are grouped together. Referring to FIG. 8(b), the grouping method forms entropy coding groups of size 1, 3, 5 and 7. The DC value S0 is considered as a separate group Group 0. The group Group 1 contains three samples S1, S2 and S8. The group Group 2 contains five samples S3, S4, S9, S10 and S11. The group Group 3 contains seven samples S5, S6, S7, S12, S13, S14 and S15. In particular, the samples assigned to each group may be selected in a zig-zag pattern within the 8×2 block.

FIG. 9 which includes FIGS. 9(a) and 9(b), illustrates an exemplary grouping method used to form entropy coding groups for one component in a block of sample values in another example. Referring to FIG. 9(a), each block of sample values for one component contains 8×2 or 16 samples S0 to S15. FIG. 9(b) illustrates a grouping method used in the Transform-skip mode and/or the Block prediction mode. In the present example, the entropy coder distributes the 16 samples into four entropy coding groups Group 0 to Group 3, where each group is coded using the CPEC structure, as shown in FIG. 9(b). In the present example, a uniform grouping method is used where the size or number of samples for each entropy coding group is the same. For instance, the uniform sample distribution is used for the transform-skip and/or the block prediction mode as the samples are all in the time domain. Referring to FIG. 9(b), the grouping method forms entropy coding groups of size 4 and all the entropy coding groups have the same size. The group Group 0 contains four samples S0, S1, S8 and S9. The group Group 1 contains four samples S2, S3, S10 and S11. The group Group 2 contains four samples S4, S5, S12 and S13. The group Group 3 contains four samples S6, S7, S14 and S15. The samples assigned to each group may be selected in a uniform pattern within the 8×2 block.

In embodiments of the present disclosure, the entropy coder implements selective differential prefix coding to exploit the correlation of the prefix values in neighboring blocks of 8×2 coefficients to improve coding efficiency. In the conventional CPEC coding scheme, the native prefix values are coded directly based on the number of bits required to encode the suffixes, without using other information. In the differential prefix coding method, the prefix value is coded by inspecting the correlation among prefix values with respect to the neighboring blocks (for example, the previous block). The entropy coder of the present disclosure applies the conventional direct prefix coding method or the differential prefix coding method selectively to realize coding efficiency gain.

In the present description, the prefix value refers to the number of bits per sample required to code the sample values in an entropy coding group. That is, the prefix value corresponding to the minimum number of bits required for a faithful reconstruction of all symbols (or sample values) in a group, sometimes referred to as "bits required" or "bits-Req". In the present description, the native prefix value can be the bitsReq value or the bitsReq-1 value. The native prefix value refers to the prefix value used to code the prefix in the conventional direct prefix coding method.

Figure 10:
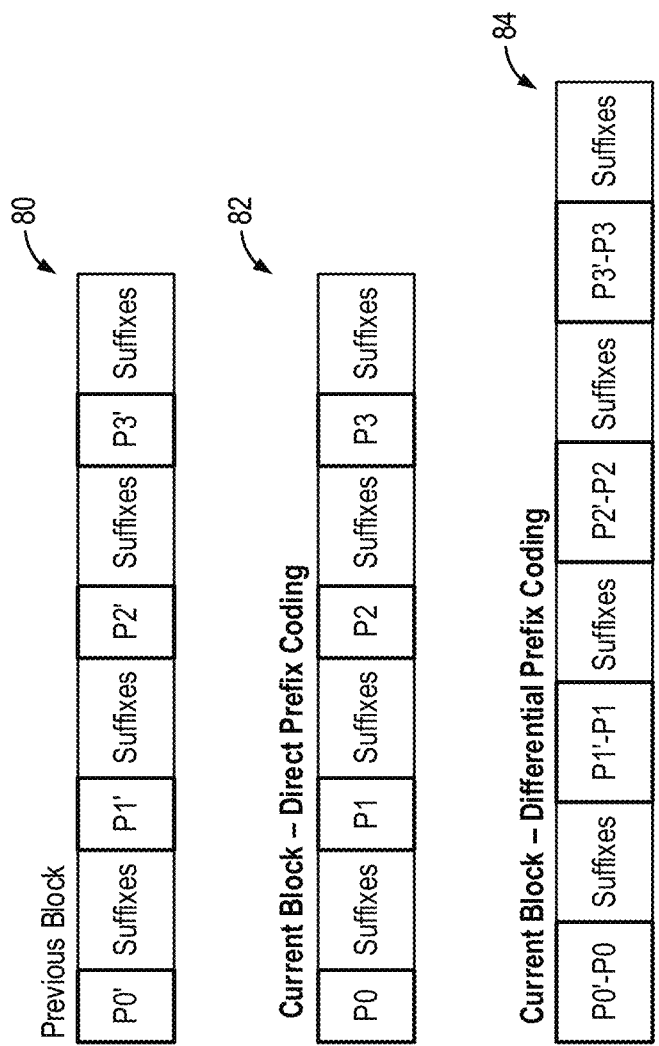
FIG. 10 illustrates the prefix coding methods that can be applied in the entropy coding method in embodiments of the present disclosure.

FIG. 10 illustrates the prefix coding methods that can be applied in the entropy coding method in embodiments of the present disclosure. Referring to FIG. 10, a previous block 80 is illustrated as including four entropy coding groups represented by prefix P0', P1', P2' and P3', each prefix followed by its respective suffix(es). The prefix P0', P1', P2' and P3' denote the native prefix value for the respective groups in the previous block of sample values 80.

A current block 82 is illustrated as being encoded using the direct prefix coding method. In the present description, the term "direct prefix coding method" refers to the conventional prefix coding method where the native prefix value is used to code the prefix. The native prefix value can be the bitsReq value or the bitsReq-1 value. In the present description, the current block 82 includes four entropy coding groups represented by prefix P0, P1, P2 and P3, each prefix followed by its respective suffix(es). The prefix P0, P1, P2 and P3 denote the native prefix value for the respective groups in the current block of sample values 82.

A current block 84 is illustrated as being encoded using the differential prefix coding method. In the present description, the term "differential prefix coding method" refers to coding the difference between the native prefix value of a group in the previous block and the corresponding native prefix value of the same group in the current block. That is, the prefix value: Pi'-Pi is coded, where i={0, 1, 2, 3}. Under differential prefix coding, in each block, the prefix for each group is coded by taking the difference of the native prefix values for that group in the previous block and in the current block. In the present description, the current block 84 includes four entropy coding groups represented by differentially coded prefix P0'-P0, P1'-P1, P2'-P2 and P3'-P3, each prefix followed by its respective suffix(es).

Accordingly, when differential prefix coding is applied, the coding groups in a current block of coefficients will have prefix values that are computed as the difference between the prefix value in a given group of the previous block and the prefix value of the same group in the current block. That is, when differential coding is applied, in each coding group (i), the prefix value is Pi'-Pi. When differential prefix coding is not applied, the coding groups in a current block of coefficients will have native prefix values that are derived using the direct prefix coding method (the traditional CPEC prefix coding method). That is, the native prefix value for each group is the number of bits required to represent each suffix in the group, either bitsReq or bitsReq-1.

In embodiments of the present disclosure, the differential prefix coding method is applied selectively based on one or more prefix coding conditions relating to the nature and properties of the block of quantized block coefficients. The entropy coding method of the present disclosure applies both the differential prefix coding and the direct prefix coding based on evaluations of the one or more prefix coding conditions. Because the prefix values under the direct prefix coding method and the differential prefix coding method have different range of numeric values, separate prefix codebooks or separate coding methods have to be used for the direct prefix coding method and the differential prefix coding method. In particular, the native prefix values under the direct prefix coding method have data values that are positive integers or 0. Meanwhile, the differential prefix values under the differential prefix coding method have data values including 0 and positive and negative integers.

FIG. 11, which includes FIGS. 11(a) and 11(b), illustrate the coding tables used to code the native prefix values and the differential prefix values in some examples. Referring to FIG. 11(a), a coding table 90, or prefix codebook, is provided for the direct prefix coding method. In the present example, coding table 90 maps the prefix values Pi for positive integers from 1 and more (column 92A). The coding table 90 maps the prefix values Pi to the prefix code using unary code (column 92B).

Referring to FIG. 11(b), a coding table 95, or prefix codebook, is provided for the differential prefix coding method. In the present example, coding table 95 maps the prefix values Pi'-Pi for negative integers to positive integers (column 97A). The coding table 95 maps the prefix values Pi'-Pi to the prefix code using unary code (column 97B).

In the examples shown in FIG. 11, the differential prefix coding table uses unary code representation. In other examples, the coding tables can use sign-magnitude representation for the differential prefix values, where the absolute value of the Pi'-Pi is coded first followed by a sign bit, where the sign bit indicates whether Pi'-Pi is positive or negative. When Pi'-Pi is zero, the sign bit is not signaled.

More specifically, differential prefix coding is efficient when the difference Pi'-Pi is close to zero. Otherwise differential prefix coding can be inefficient. The following examples illustrate the cases where the difference prefix Pi'-Pi is not close to zero and when the difference prefix Pi'-Pi is close to zero.

Example 1

Assume P0=3, P0'=1, P0'-P0=1-3=-2. Using the coding table 95 for coding the difference in prefix value Pi'-Pi, the number of bits required to code P0'-P0=-2 ("11110") is 5. That is, using differential prefix coding, the number of bits required to code the differential prefix value (-2) is 5. However, using the coding table 90 for direct prefix coding, the number of bits required to code the prefix value (P0=3) is 3 ("110"). Therefore, in this case, if differential prefix coding is used, the coding efficiency is lost.

Example 2

Assume P0=3, P0'=3, P0'-P0=3-3=0. Using the coding table, the number of bits required to code P0'-P0=0 is 1 ("0"). That is, using differential prefix coding, the number of bits required to code the differential prefix value (0) is 1. Meanwhile, using the coding table 90 for direct prefix coding, the number of bits required to code the prefix value (P0=3) is 3 ("110"). Therefore, in this case, differential prefix coding can be used to improve coding efficiency.

In the above description, prefix coding tables or prefix codebooks for coding the native prefix values and the differential prefix values are illustrated. In some examples, the coding tables may be stored in a memory in the entropy coder. In other examples, the prefix coding tables are not provided in the entropy coder. That is, actual prefix coding tables are not stored in the memory of the entropy coder. Instead, only the prefix coding methods are provided in the entropy coder. For example, the direct prefix coding method and the differential prefix coding method are stored in the entropy coder. The prefix code word for a prefix value (i.e., the bit representation of the prefix value) is calculated on-the-fly in real time using the respective prefix coding method. In this manner, memory space for storing the prefix coding tables can be saved.

In one example, the direct prefix coding method for coding native prefix values uses unary code representation and the differential prefix coding method for coding differential prefix values uses unary code representation or sign-magnitude representation.

In embodiments of the present disclosure, differential prefix coding is applied selectively based on a given set of rules or prefix coding conditions to ensure coding efficiency. In one embodiment, if all the prefix coding conditions are met, differential prefix coding is applied; otherwise differential prefix coding is not applied and direct prefix coding is used. In one embodiment, the prefix coding conditions are derived based on the past history or on already coded information so that the decoder can decode successfully, without requiring separate signaling between the transmitter and the receiver.

In one embodiment, the entropy coding method uses three prefix coding conditions to determine when differential prefix coding should be applied. The three prefix coding conditions are:

Condition 1: mode consistency;
Condition 2: unavailable prefix value handling; and
Condition 3: noise handling.

Figure 12:
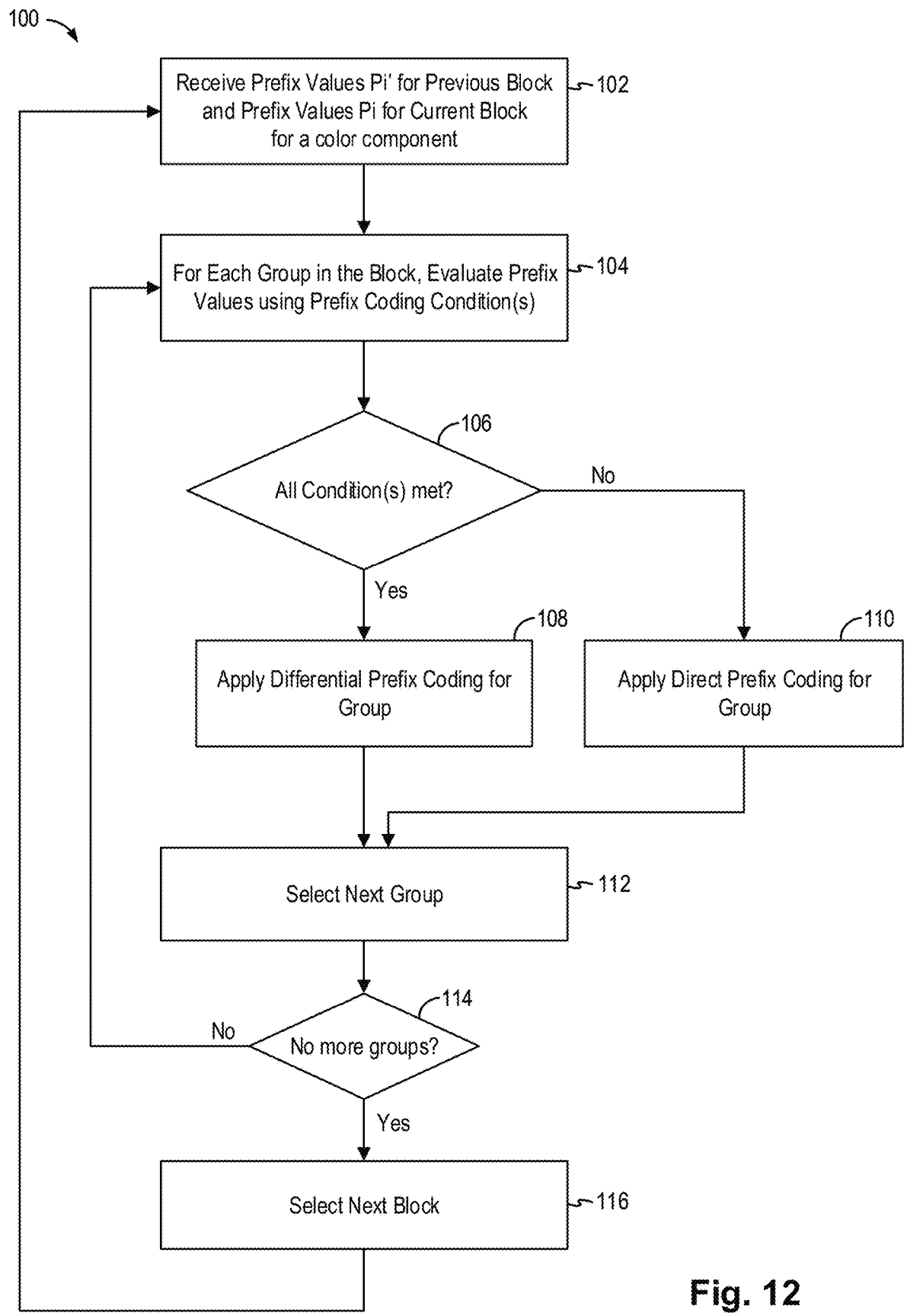
FIG. 12 is a flowchart illustrating the entropy coding method for selectively applying differential prefix coding in some embodiments.

In one embodiment, in the event all three conditions are met, then differential prefix coding is applied to code the prefix for the group. If at least one of the three conditions is not met, then differential prefix coding is not applied and direct prefix coding is used to code the prefix for the group. FIG. 12 is a flowchart illustrating the entropy coding method for selectively applying differential prefix coding in some embodiments.

Referring to FIG. 12, an entropy coding method 100 starts by receiving native prefix values Pi' for the previous block of sample values and native prefix values Pi for the current block of sample values (102). The method 100 then evaluates the prefix values Pi' and Pi for each group in the block using one or more prefix coding conditions (104). The method 100 determines if all the prefix conditions are met (106). In the event at least one prefix coding condition is not met, the method 100 applies the direct prefix coding method for the group using the native prefix values Pi for the group (110). The direct prefix coding method generates the bit representation of the native prefix values Pi to use as the prefix. In the event all of the prefix coding conditions are met, the method 100 applies the differential prefix coding method for the group using the prefix values Pi'-Pi for the group (108). The differential prefix coding method generates the bit representation of the prefix values Pi'-Pi to use as the prefix.

The method 100 then selects the next group (112) and the method 100 continues by repeating at 104 to evaluate the prefix values for the newly selected group. The method 100 repeats at 104 to 112 until there are no more groups (114). The method 100 then selects the next block of sample values (116) and the method repeats at 102 to receive the native prefix values Pi' for the previous block and the native prefix values Pi for the current block.

The pseudocode for the entropy coding method implementing the selective differential prefix coding using three prefix coding conditions is shown in FIG. 19.

In other embodiments, the entropy coding method can apply one or more prefix coding conditions to evaluate the native prefix values for the previous block and the current block of data samples. The use of three prefix coding conditions is illustrative only and not intended to be limiting.

The prefix coding conditions will now be described in more details.

Condition 1: Mode Consistency

In embodiments of the present disclosure, Condition 1, the mode consistency condition, determines whether the previous block and the current block are encoded using the same VDC-M coding mode. Differential prefix coding can be applied only when the current block and the previous block use the same coding mode. Accordingly, Condition 1 is met when the previous block and the current block are encoded using the same VDC-M coding mode. Condition 1 is not met when the previous block and the current block are encoded using the different VDC-M coding modes.

Figures 13, 14:
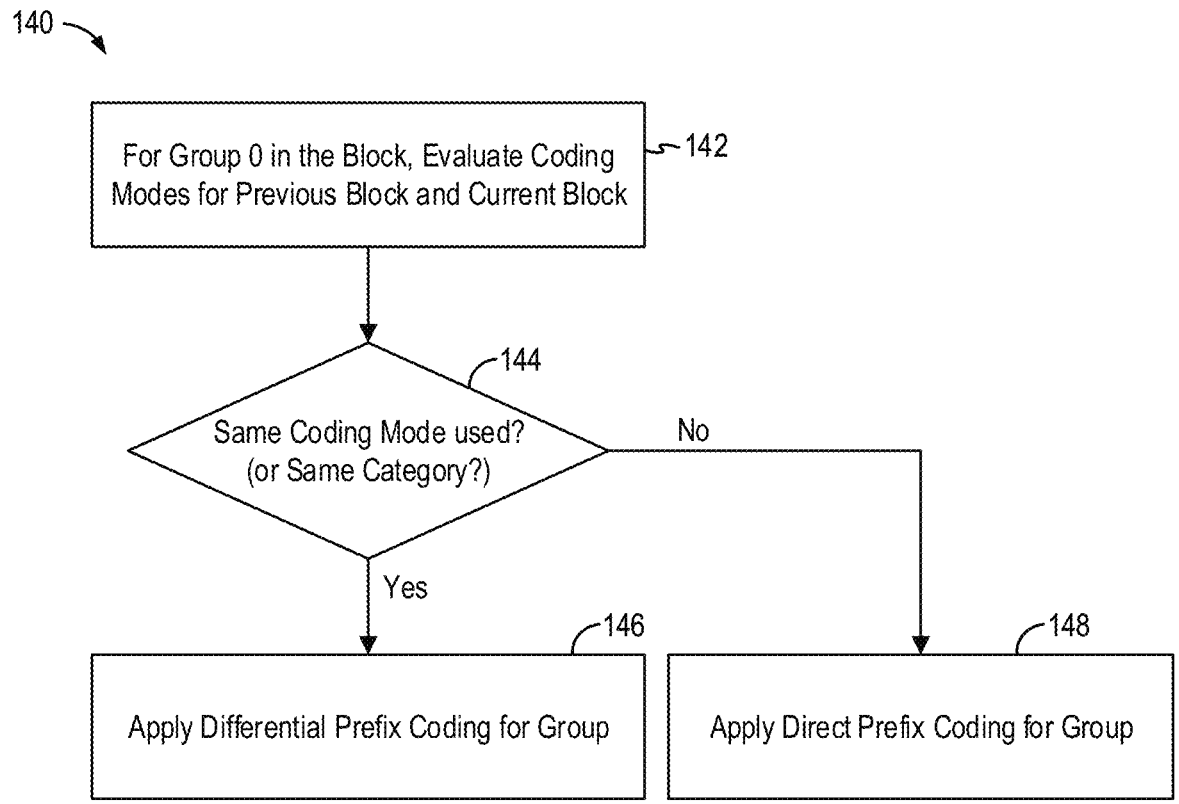
FIG. 13 illustrates some example coding mode combinations used in a previous block and in a current block of sample values.
FIG. 14 is a flowchart illustrating the application of the mode consistency condition in some embodiments.

FIG. 13 illustrates some example coding mode combinations used in a previous block and in a current block of sample values. Referring to FIG. 13, table 120 illustrates the application of the Condition 1 to evaluate the consistency of the coding modes used for the previous block and for the current block. In the first example (121), Condition 1 is met when the previous block and the current block are both encoded using the Transform mode. In that case, differential prefix coding can be applied to the current block, after evaluation using other prefix conditions, if any. In the second example (122), Condition 1 is met when the previous block and the current block are both encoded using the Transform-skip mode. In that case, differential prefix coding can be applied to the current block, after evaluation using other prefix conditions, if any. The same is true when the previous block and the current block are both encoded using the block prediction mode. In another example, when both the previous block and the current block are encoded using the block prediction mode, differential prefix coding can be applied to the current block, after evaluation using other prefix conditions, if any.

In the third example (123), Condition 1 is not met when the previous block is encoded using the Transform mode and the current block is encoded using the Transform-skip mode. In that case, direct prefix coding is applied to the current block. In the fourth example (124), Condition 1 is not met when the previous block is encoded using the Transform-skip mode and the current block is encoded using the Transform mode. In that case, direct prefix coding is applied to the current block. In the last example (125), Condition 1 is not met when the previous block is encoded using the Block Prediction mode and the current block is encoded using the Transform mode. In that case, direct prefix coding is applied to the current block.

FIG. 13 illustrates examples where Condition 1 (mode consistency mode) is met and where Condition 1 is not met. The examples shown in FIG. 13 illustrate the cases where the Transform mode, the Transform-skip mode and the Block Prediction mode are being used. It is understood that the examples in FIG. 13 are illustrative only and not intended to be limiting. In actual implementation, the mode consistency condition is applied to evaluate all of the coding modes used by the entropy coder. In some embodiments, the mode consistency condition is used only for coding modes that applies CPEC. For coding modes not applying CPEC, the pixel values are not grouped and there are not prefix and suffices. In those cases, differential prefix coding is not considered, as will be explained in more detail below.

In other words, differential prefix coding can be applied only when the current block and the previous block uses the same coding mode; differential prefix coding is not applied and direct prefix coding is used when the current block and the previous block uses the different coding modes. The mode consistency condition is used to ensure that there is no mismatch in the distribution of the sample values into coding groups between the previous block and the current block. For example, in the transform mode, quantized transform coefficients are encoded, whereas in the transform skip mode and/or in block prediction mode quantized residuals are encoded. As shown in FIGS. 8 and 9 above, the distribution of sample values into the coding groups is different for the transform mode and the transform skip mode. Differential prefix coding should be not used in the case where the previous block and the current block use different coding modes.

The differential prefix coding method described here is applicable for all coding modes implemented in VDC-M codec. In some embodiments, the mode consistency condition evaluates all of the coding modes, including Transform, Transform-skip, Block Prediction, Block Prediction-Skip, Midpoint prediction mode, and midpoint prediction fallback mode.

In embodiments of the present disclosure, the mode consistency condition (Condition 1) is applied to evaluate the coding modes used based on categories of coding modes, as opposed to individual coding modes. In some embodiments, the VDC-M coding modes are grouped into categories of coding modes. The mode consistency condition evaluates the coding modes used for the previous block and the current block to determine if the coding modes used belong to the same category or if the coding modes belong to different categories.

In one embodiment, the multiple coding modes in VDC-M codec are grouped into two categories. The first category includes coding modes that apply a transform, such as the Transform mode, and the second category includes coding modes where a transform is not applied, such as the transform-skip mode and the block prediction mode. In another embodiment, the multiple coding modes in VDC-M codec are grouped into two categories. The first category includes coding modes that code the sample values in the frequency domain, such as the Transform mode, and the second category includes coding modes that code the sample values in the spatial domain, such as the transform-skip mode and the block prediction mode.

When coding mode categories are used, the mode consistency condition (Condition 1) is met when the current block and previous block are encoded using coding mode(s) from the same category and differential prefix coding can be applied, after evaluation using other prefix conditions, if any. Differential prefix coding is not applied when the current block and previous block are encoded using coding modes from different categories.

In one example, differential prefix coding can be applied when the previous block is coded using the block prediction mode (the second category) and the current block is coded using the transform-skip mode (the second category). In another example, differential prefix coding is not applied when the previous block is coded using the block prediction mode (the second category) and the current block is coded using the transform mode (the first category).

In some embodiments, the mode consistency condition (Condition 1) is checked only for group 0 in the block. Because all groups in the block are encoded using the same coding mode, Condition 1 only needs to verify the first group—group 0—for mode consistency to enhance performance and efficiency. The method assumes the same coding mode as group 0 is used for all other groups. The mode consistency condition only needs to be verified for the first group and the result can be applied to all the other groups in the block. That is, if the mode consistency condition is met by group 0, then it is assumed that the mode consistency condition is met by all other groups in the block. On the other hand, if the mode consistency condition is not met by group 0, then it is assumed that the mode consistency condition is not met by all other groups in the block. No further evaluation of each respective other group is needed. In another embodiment, mode consistency check is applied only for the first group—group 0, and for other groups the mode consistency check is not applied at all. For example, for all groups other than the first group, the mode consistency condition is always assumed to be true by default.

FIG. 14 is a flowchart illustrating the application of the mode consistency condition in some embodiments. Referring to FIG. 14, a method 140 starts by evaluating the coding modes used for the first group (Group 0) in the previous block and the current block (142). The method 140 determines if the coding modes are the same (144). Alternately, the method 140 can determine if the coding modes belong to the same category of coding modes. If the coding modes are the same (or the coding modes belong to the same category), the mode consistency condition is met and differential prefix coding can be applied (146). If the coding modes are not the same (or the coding modes belong to different categories), the mode consistency condition is not met and differential prefix coding is not applied and the direct prefix coding is applied (148).

Condition 2: Unavailable Prefix Value Handling

In embodiments of the present disclosure, Condition 2, the prefix availability condition, evaluates situations where the prefix value for a respective group in either the previous block or the current block is unavailable. For example, when all sample values in a group are zero and the group skip bit is used, then a group will not have any prefix values. Accordingly, Condition 2 is met when corresponding groups in the previous block and the current block have available prefix values. For example, Condition 2 is met when the corresponding groups in the previous block and the current block are not coded using group skip. Condition 2 is not met when the corresponding group in either the previous block or the current block does not have prefix values. For example, the corresponding group in the previous block or the current block is coded using group skip.

In one embodiment, differential prefix coding can be applied only when both the corresponding groups in the current and previous blocks are not coded using group skip. When a group in the current block is coded using group skip, then prefix coding is not required for the group and the evaluation under Condition 2 or any other condition can be skipped for the group. When a group in the current block is not coded using group skip but the corresponding group in the previous block is coded using group skip, differential prefix coding is not applied and direct prefix coding is used.

FIG. 15 illustrates some example prefix availability conditions in a previous block and in a current block of sample values. Referring to FIG. 15, table 160 illustrates the application of the Condition 2 to evaluate the availability of prefix values for each entropy coding groups in the previous block and in the current block. In the first group (Group Index 0), the previous block and the current block have available prefix values. Prefix coding is required for Group 0 in the current block and differential prefix coding can be applied. The prefix value to be coded will be the difference of the prefix values for the previous block and the current block: 2−2=0. Accordingly, using the differential prefix coding table 95 (FIG. 11(b)), the prefix value 0 is coded and the prefix code is "0" for Group 0.

In the second group (Group Index 1), the prefix value for the previous block is denoted by "x" to indicate that the prefix value for the previous group is not available. For example, the group skip bit may have been used for Group 1 in the previous block. Meanwhile, the prefix value for the current block is available and has a value of "1". Prefix coding is required for Group 1 in the current block but differential prefix coding is not applied and direct prefix coding is used instead. The prefix value to be coded will be the native prefix value for Group 1 in the current block—that is the prefix value of "1". Accordingly, using the direct prefix coding table 90 (FIG. 11(a)), the prefix value 1 is coded and the prefix code is "0" for Group 1.

In the third and fourth groups (Group Index 2 and 3), the prefix values for the current block are not available ("x"). For example, group skip may be used for Group 2 and Group 3 in the current block. In that case, prefix coding is not required for the current block and the prefix availability condition does not need to be evaluated as the current block does not require prefix coding.

Figure 16:
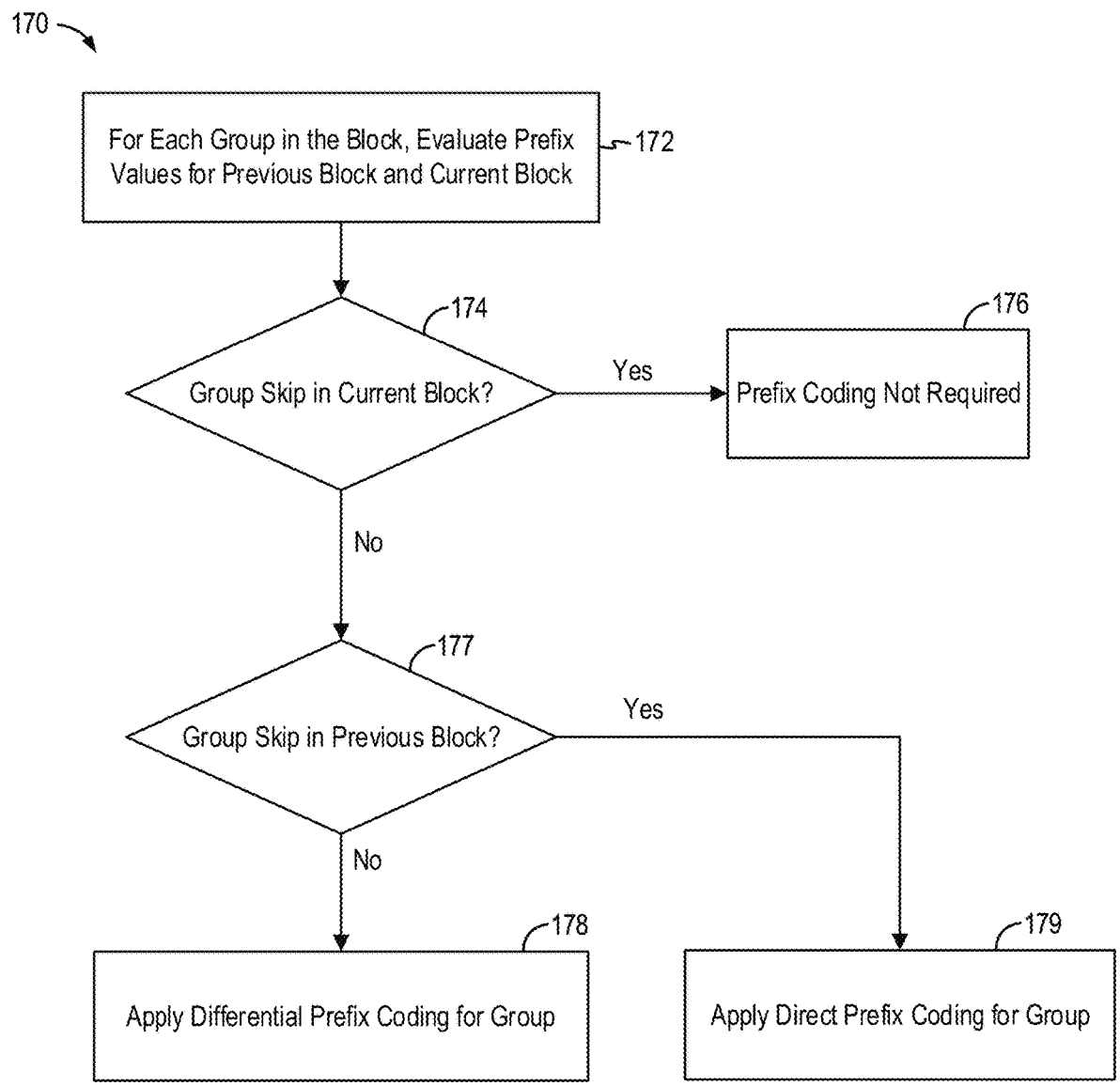
FIG. 16 is a flowchart illustrating the application of the prefix availability condition in some embodiments.

FIG. 16 is a flowchart illustrating the application of the prefix availability condition in some embodiments. Referring to FIG. 16, a method 170 starts by evaluating the prefix values for the previous block and the current block for each group in the block (172). The method 170 determines if group skip is used for the group in the current block (174). If group skip is used, then prefix coding is not required for the group in the current block (176) and the evaluation is terminated. If group skip is not used for the group in the current block, then the method 170 evaluates if group skip is used for the group in the previous block (177). If group skip is used for the group in the previous block, then differential prefix coding cannot be used and direct prefix coding is applied for the group in the current block (179). If group skip is not used in the previous block, then differential prefix coding can be applied to the group in the current block (178).

The pseudocode for the implementing the prefix availability condition is shown in FIG. 20.

Condition 3: Noise Handling

Differential prefix coding can be susceptible to noise. In embodiments of the present disclosure, differential prefix coding can be applied only when the prefix value for a respective group in the previous block is greater than or equal to a threshold. For example, the threshold value is 2. In that case, only when the prefix value Pi' for the group i in the previous block is greater than 2 will the differential prefix coding be applied. Accordingly, Condition 3, the prefix threshold condition, is met when a group in the previous block has a prefix value that is greater than or equal to the threshold value. Condition 3 is not met when a group in the previous block has a prefix value that is less than the threshold value. The prefix value for the group in the previous used to evaluate the prefix threshold condition is the reconstructed native prefix value for the group in the previous block.

In one embodiment, differential prefix coding can be applied only when the reconstructed native prefix value for a group in the previous block is greater than or equal to the threshold value. Differential prefix coding is not applied and the direct prefix coding is used when the reconstructed native prefix value for the group in the previous block is less than the threshold value.

Figure 17:
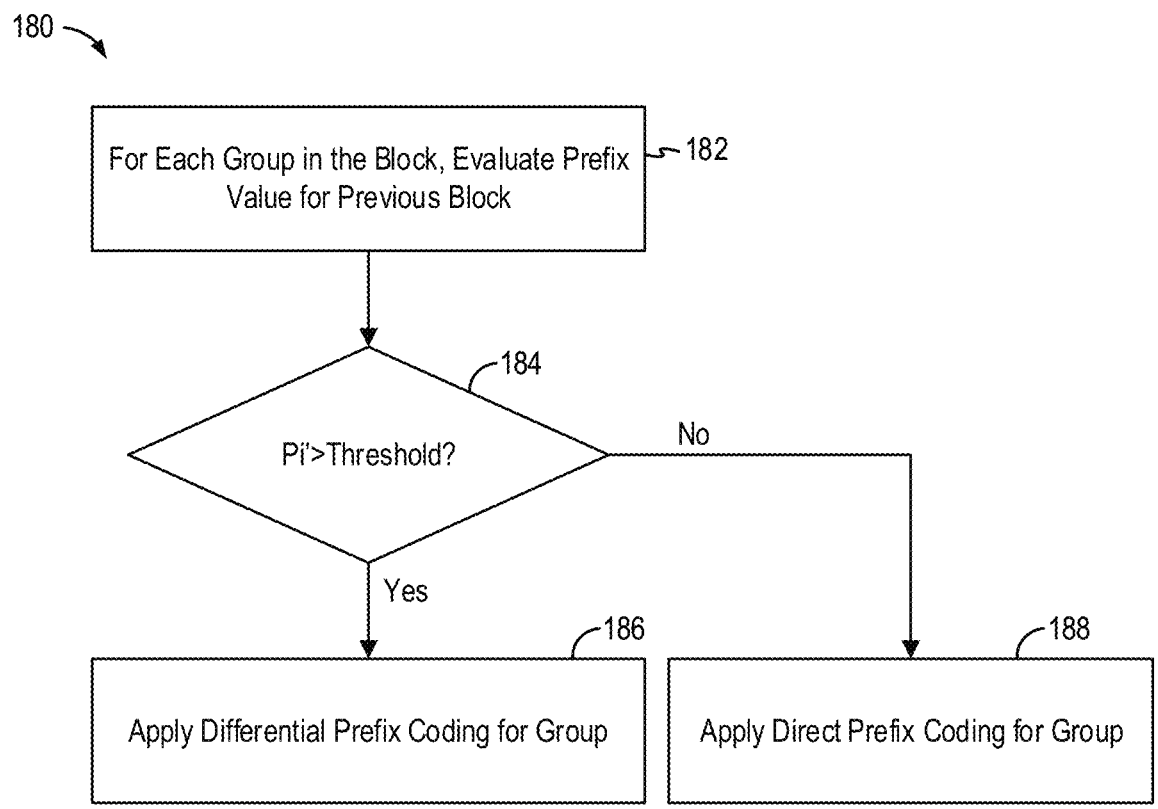
FIG. 17 is a flowchart illustrating the application of the prefix threshold condition in some embodiments.

FIG. 17 is a flowchart illustrating the application of the prefix threshold condition in some embodiments. Referring to FIG. 17, a method 180 starts by evaluating the prefix value for the previous block for each group in the block (182). The prefix value for the group in the previous block should be the reconstructed native prefix value for the group. The method 180 determines if the prefix value for the group in the previous block (Pi') is greater than a threshold value (184). In some embodiments, the method 180 determines if the prefix value for the group in the previous block (Pi') is greater than or equal to a threshold value. If the prefix value for the group in the previous block (Pi') is greater than (or equal to) the threshold value, then differential prefix coding can be applied to the group in the current block (186). If the prefix value for the group in the previous block (Pi') is not greater than (or equal to) the threshold value, then differential prefix coding cannot be used and direct prefix coding is applied for the group in the current block (188).

The pseudocode for the implementing the prefix threshold condition is shown in FIG. 21.

Entropy Coding Method

Figure 18:
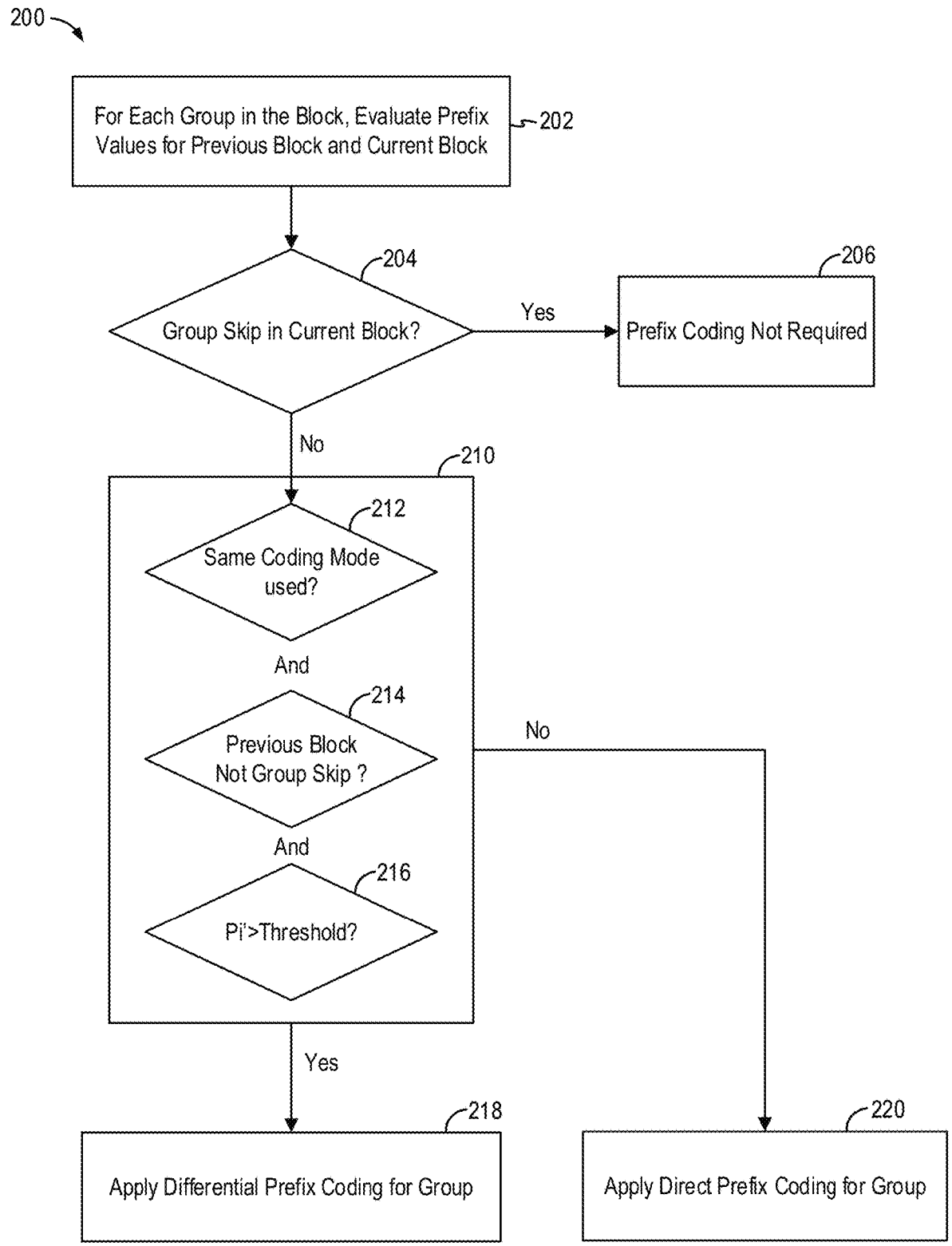
FIG. 18 is a flowchart illustrating the entropy coding method using three prefix coding conditions for selectively applying differential prefix coding in some embodiments.

In some embodiments, the entropy coding method applies differential prefix coding method when all three prefix coding conditions described above are met. FIG. 18 is a flowchart illustrating the entropy coding method using three prefix coding conditions for selectively applying differential prefix coding in some embodiments. Referring to FIG. 18, an entropy coding method 200 starts by evaluating reconstructed native prefix values Pi' for the previous block of sample values and native prefix values Pi for the current block of sample values (202). The method 200 evaluates the prefix values Pi' and Pi for each group in the blocks. The method 200 first determines if group skip is used for the group in the current block (204). If group skip is used, then prefix coding is not required for the group in the current block (206) and the prefix coding evaluation is terminated.

If group skip is not used for the group in the current block, the method 200 evaluates the three prefix coding conditions (210). For the first prefix coding condition, the method 200 determines if the coding modes used by the previous block and the current block are the same (212). Alternately, the method 200 can determine if the coding modes used by the previous block and the current block belong to the same category of coding modes. The mode consistency condition (212) is met when the coding modes are the same (or the coding modes belong to the same category). In some embodiments, the mode consistency condition (212) is evaluated only for the first group in the block since all groups in a block uses the same coding mode.

For the second prefix coding condition, the method 200 determines if group skip is used for the group in the previous block (214). The prefix availability condition (214) is met when the group skip is not used in the previous block. The prefix availability condition is evaluated for each group in the previous block.

For the third prefix coding condition, the method 200 determines if the prefix value for the group in the previous block (Pi') is greater than a threshold value (216). In some embodiment, the method 200 determines if the prefix value for the group in the previous block (Pi') is greater than or equal to the threshold value. The prefix value for the group in the previous block should be the reconstructed native prefix value for the group. The prefix threshold condition is met when the prefix value for the group in the previous block (Pi') is greater than (or equal to) the threshold value.

The method 200 evaluates the three prefix coding conditions 210. The method 200 applies the differential prefix coding for the group in the current block only when all three conditions are met (218). If at least one of the prefix coding conditions is not met, the method 200 applies the direct prefix coding for the group in the current block (220).

The pseudocode for the implementing the entropy coding method using three prefix coding conditions for selectively applying differential prefix coding is shown in FIG. 22.

In embodiments of the present disclosure, the entropy coding method described above can be applied to video content coded in any chroma formats, including 4:4:4 video content, 4:2:2 video content or 4:2:0 video content. In some embodiments, differential prefix coding is applied for each color components in a pixel data block, as long as all of the applicable pixel coding conditions are met.

In embodiments of the present disclosure, the entropy coding method applies the differential prefix coding method only in the case where both the current and previous blocks are coded using CPEC. In the case the current block is not coded using CPEC, the entropy coding method does not perform any evaluation as the current block does not have to group the samples and therefore, there are not prefix or suffixes to consider. In some embodiments, method 200 starts by determining whether the current block is coded using CPEC. When the current block is coded using CPEC, the method 200 continues to 202. When the current block is not coded using CPEC, method 200 terminates and does not proceed further.

In some embodiments, certain coding modes do not use CPEC. For example, the Midpoint Prediction (MPP) mode, Midpoint Prediction Fallback (MPPF) mode, and Block Prediction Skip (BP-Skip) do not use CPEC. In the event that the current block is coded using one of MPP, MPPF and BP-Skip modes, then method 200 terminates and no further evaluation is performed.

In the case the current block is coded using CPEC (such as Transform mode, Transform-skip mode, and Block Prediction mode), the method 200 proceeds to 202 to evaluate the reconstructed native prefix values Pi' for the previous block of sample values and native prefix values Pi for the current block of sample values. In the event the previous block is not coded using CPEC, then the mode consistency condition would fail and differential prefix coding would not be applied and direct prefix coding is applied instead.

In some cases, component skip is applied when all the quantized residuals in a component are found to be zero. In other words, all 16 samples in the 8×2 block of quantized block coefficients are zero for a component. In that case, the entire block of 16 samples for the component is skipped by using a Component skip bit.

In embodiments of the present disclosure, when component skip is enabled in the entropy coder, the entropy coding method is implemented using a component skip condition to determine if differential prefix coding should be applied. In some embodiments, the component skip condition can be used as an additional prefix coding condition (e.g. Condition 4) to other prefix coding conditions being used. In one embodiment, the entropy coding method applies the component skip condition to handle the case when component skip is used for either the previous block or the current block. When component skip bit is asserted for the current block, then prefix coding is not required and the prefix evaluation can be terminated for all other prefix coding conditions. When component skip bit is not asserted for the current block but is asserted for the previous block, then differential coding cannot be applied as prefix values for the previous block is not available and direct prefix coding is used. In the case when component skip bit is not asserted for either the previous block or the current block, then differential prefix coding can be applied, after evaluation using other prefix conditions, if any.

It is instructive to note that in the above description, references to sample values for a block (previous or current) refer to samples value per component for the block. It is understood that each block of pixels includes pixel or sample values for one or more color components. The above description refers to sample values in a block per component and the prefix coding evaluations are performed for each color component in a block of sample values.

The present disclosure can be implemented in numerous ways, including as a process; an apparatus; a system; a composition of matter; a computer program product embodied on a computer readable storage medium; and/or a processor, such as a hardware processor or a processor device configured to execute instructions stored on and/or provided by a memory coupled to the processor. In this specification, these implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the present disclosure is provided above along with accompanying figures that illustrate the principles of the present disclosure. The present disclosure is described in connection with such embodiments, but the present disclosure is not limited to any embodiment. The scope of the present disclosure is limited only by the claims and the present disclosure encompasses numerous alternatives, modifications and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

The above detailed descriptions are provided to illustrate specific embodiments of the present disclosure and are not intended to be limiting. Numerous modifications and variations within the scope of the present disclosure are possible. The present disclosure is defined by the appended claims.

What is claimed is:

1. A method of entropy coding data samples, comprising:
   receiving a block of sample values generated by a selected coding mode as a current block of sample values;

forming a plurality of entropy coding groups by distributing the sample values into the plurality of entropy coding groups;

converting the sample values in each entropy coding group to a selected bit-based representation, each encoded sample value forming a suffix of the entropy coding group, suffixes within a respective entropy coding group having a same bit size;

for each entropy coding group, determining a native prefix value indicative of a bit of the suffixes in the group;

for each entropy coding group, evaluating at least one prefix coding condition for the group in the current block and a corresponding group in a previous block of sample values;

in response to determining that the at least one prefix coding condition is met, applying differential prefix coding to code a differential prefix value being a difference between the native prefix value of the group in the previous block and the native prefix value of the group in the current block to generate a second bit-based representation of the differential prefix value to use as a prefix for the group in the current block; and in response to determining that the at least one prefix coding condition is not met, applying direct prefix coding to code the native prefix value for the group in the current block to generate a first bit-based representation of the native prefix value to use as the prefix for the group in the current block.

2. The method of claim 1, wherein the at least one prefix coding conditions comprises evaluating coding modes used to code the current block of sample values and the previous block of sample values, the method further comprising:

for a first entropy coding group, evaluating the selected coding mode used to code the current block of sample values and the selected coding mode used to code the previous block of sample values;

in response to determining that the selected coding mode used to code the current block is the same as the selected coding mode used to code the previous block, applying differential prefix coding to code the differential prefix value to generate the second bit-based representation of the differential prefix value to use as the prefix for the group in the current block; and in response to determining that the selected coding mode used to code the current block is different the coding mode used to code the previous block, applying direct prefix coding to code the native prefix value for the group in the current block to generate the first bit-based representation of the native prefix value to use as the prefix for the group in the current block.

3. The method of claim 2, wherein subsequent to evaluating the coding modes used to code the current block of sample values and the previous block of sample values for the first entropy coding group, generating the prefix for the other entropy groups in the current block using the prefix coding method used for the first entropy coding group.

4. The method of claim 1, wherein each block of sample values are generated using a coding mode selected from a plurality of coding modes, the plurality of coding modes comprising a first category of coding modes and a second category of coding modes, and the at least one prefix coding conditions comprises evaluating the categories of the coding modes used to code the current block of sample values and the previous block of sample values, the method further comprising:

for a first entropy coding group, evaluating the selected coding mode used to code the current block of sample values and the selected coding mode used to code the previous block of sample values;

in response to determining that the selected coding mode used to code the current block and the selected coding mode used to code the previous block are in the same category of the coding modes, applying differential prefix coding to code the differential prefix value to generate the second bit-based representation of the differential prefix value to use as the prefix for the group in the current block; and in response to determining that the selected coding mode used to code the current block and the coding mode used to code the previous block are in different categories of the coding modes, applying direct prefix coding to code the native prefix value for the group in the current block to generate the first bit-based representation of the native prefix value to use as the prefix for the group in the current block.

5. The method of claim 4, wherein subsequent to evaluating the categories of the coding modes used to code the current block of sample values and the previous block of sample values for the first entropy coding group, generating the prefix for the other entropy groups in the current block using the prefix coding method used for the first entropy coding group.

6. The method of claim 4, wherein the first category of coding modes comprises coding modes applying a frequency domain transform to the sample values and the second category of coding modes comprises coding modes processing sample values in the spatial domain.

7. The method of claim 1, wherein the at least one prefix coding conditions comprises evaluating the availability of the native prefix value in the corresponding group of the previous block of sample values, the method further comprising:

for each entropy coding group in the current block, determining the availability of a native prefix value for the group in the current block of sample values;

in response to determining that a native prefix value is not available for the group in the current block of sample values, determining prefix coding is not required for the group in the current block;

in response to determining that a native prefix value is available for the group in the current block of sample values, determining the availability of a native prefix value for the corresponding group in the previous block of sample values;

in response to determining that a native prefix value is available for the corresponding group in the previous block of sample values, applying differential prefix coding to code the differential prefix value to generate the second bit-based representation of the differential prefix value to use as the prefix for the group in the current block; and in response to determining that a native prefix value is not available for the corresponding group in the previous block of sample values, applying direct prefix coding to code the native prefix value for the group in the current block to generate the first bit-based representation of the native prefix value to use as the prefix for the group in the current block.

8. The method of claim 7, wherein determining the availability of a native prefix value for the group in the current block of sample values and determining the availability of a native prefix value for the corresponding group in the previous block of sample values comprises determining whether a group skip has been asserted for the group in the current block or the previous block, the native prefix value being not available for an entropy coding group when the group skip has been asserted for the group.

9. The method of claim 1, wherein the at least one prefix coding conditions comprises evaluating the native prefix value of the previous block of sample values relative to a threshold value, the method further comprising:
for each entropy coding group, determining whether a native prefix value for the corresponding group in the previous block of sample values is greater than a first threshold value;
in response to determining that the native prefix value for the corresponding group in the previous block of sample values is greater than the first threshold value, applying differential prefix coding to code the differential prefix value to generate the second bit-based representation of the differential prefix value to use as the prefix for the group in the current block; and
in response to determining that the native prefix value for the corresponding group in the previous block of sample values is less than the first threshold value, applying direct prefix coding to code the native prefix value for the group in the current block to generate the first bit-based representation of the native prefix value to use as the prefix for the group in the current block.

10. The method of claim 9, wherein the first threshold value comprises a value between 1 and 2.

11. The method of claim 1, wherein the at least one prefix coding conditions comprises evaluating the availability of the native prefix value in the previous block of sample values, the method further comprising:
determining whether a component skip bit has been asserted for a given component in the current block of sample values;
in response to determining that the component skip bit is asserted for a given component the current block, determining prefix coding is not required for the current block;
in response to determining that the component skip bit is not asserted for a component in the current block, determining whether a component skip bit has been asserted for the corresponding component in the previous block of sample values;
in response to determining that the component skip bit has not been asserted for the corresponding component in the previous block of sample values, applying differential prefix coding to code the differential prefix value to generate the second bit-based representation of the differential prefix value to use as the prefix for the group in the current block; and
in response to determining that the component skip bit has been asserted for the corresponding component in the previous block of sample values, applying direct prefix coding to code the native prefix value for the group in the current block to generate the first bit-based representation of the native prefix value to use as the prefix for the group in the current block.

12. A method of entropy coding data samples, comprising:
receiving a block of sample values generated by a selected coding mode as a current block of sample values;
forming a plurality of entropy coding groups by distributing the sample values into the plurality of entropy coding groups;
converting the sample values in each entropy coding group to a selected bit-based representation, each encoded sample value forming a suffix of the entropy coding group, the suffixes within a respective entropy coding group having a same bit size;
for each entropy coding group, determining a native prefix value indicative of a bit size of the suffixes in the group;
for each entropy coding group in the current block, determining whether a group skip has been asserted for the group;
in response to determining that the group skip has been asserted for the group, determining prefix coding is not required for the group in the current block;
in response to determining that the group skip has not been asserted for the group, evaluating the native prefix value of the group in the current block and the native prefix value for a corresponding group in a previous block of sample values using three prefix coding conditions, comprising:
for a first entropy coding group, determining that the selected coding mode used to code the group in the current block is the same as or is in the same coding mode category as the selected coding mode used to code the group in the previous block;
for each entropy coding group, determining that a native prefix value is available for the corresponding group in the previous block of sample values; and
for each entropy coding group, determining that the native prefix value for the corresponding group in the previous block of sample values is greater than a first threshold value;
in response to the three prefix coding conditions being met, applying differential prefix coding to code a differential prefix value being a difference between the native prefix value of the group in the previous block and the native prefix value of the group in the current block to generate a second bit-based representation of the differential prefix value to use as a prefix for the group in the current block; and
in response to at least one of the three prefix coding conditions not being met, applying direct prefix coding to code the native prefix value for the group in the current block to generate a first bit-based representation of the native prefix value to use as the prefix for the group in the current block.

13. The method of claim 12, further comprising:
providing a first prefix coding method for coding native prefix values using the first bit-based representation; and
providing a second prefix coding method for coding differential prefix values using the second bit-based representation,
wherein applying differential prefix coding comprises determining the differential prefix value being the difference between the native prefix value of the group in the previous block and the native prefix value of the group in the current block, and converting the differential prefix value using the second prefix coding method to use as the prefix for the group in the current block; and
applying direct prefix coding comprises converting the native prefix value for the group in the current block using the first prefix coding method to use as the prefix for the group in the current block.

14. The method of claim 12, wherein subsequent to evaluating coding modes used to code the current block of sample values and the previous block of sample values for the first entropy coding group, generating the prefix for the other entropy groups in the current block using the prefix coding method used for the first entropy coding group.

15. The method of claim 12, wherein each block of sample values are generated using a coding mode selected from a plurality of coding modes, the plurality of coding modes comprising a first category of coding modes applying a frequency domain transform to the sample values and a second category of coding modes processing sample values in the spatial domain.

16. The method of claim 12, wherein determining that a native prefix value is available for the corresponding group in the previous block of sample values comprises determining that the group skip has not been asserted for the corresponding group in the previous block of sample values.

17. The method of claim 12, wherein the first threshold value comprises a value between 1 and 2.

18. The method of claim 1, further comprising:
in response to determining that a group skip has not been asserted for the group, evaluating the native prefix value of the group in the current block and the native prefix value for the corresponding group in a previous block of sample values using an additional prefix coding condition, comprising:
determining whether a component skip bit has been asserted for a given component in the current block of sample values;
in response to determining that the component skip bit is asserted for a given component the current block, determining prefix coding is not required for the current block;
in response to determining that the component skip bit is not asserted for a component in the current block, determining whether a component skip bit has been asserted for the corresponding component in the previous block of sample values;
in response to determining that the component skip bit has not been asserted for the corresponding component in the previous block of sample values, applying differential prefix coding to code the differential prefix value to generate the second bit-based representation of the differential prefix value to use as the prefix for the group in the current block; and
in response to determining that the component skip bit has been asserted for the corresponding component in the previous block of sample values, applying direct prefix coding to code the native prefix value for the group in the current block to generate the first bit-based representation of the native prefix value to use as the prefix for the group in the current block.

19. The method of claim 13, wherein the first prefix coding method generates the first bit-based representation of the native prefix value using unary code representation and the second prefix coding method generates the second bit-based representation of the differential prefix value using unary code representation or sign magnitude representation.

* * * * *